United States Patent [19]
Greene et al.

[11] Patent Number: 5,630,915
[45] Date of Patent: May 20, 1997

[54] LIQUID DECONTAMINATION SYSTEM USING ELECTRICAL DISCHARGE WITH GAS INJECTION

[76] Inventors: Hugh W. Greene, P.O. Box 8, Somerville, Ala. 35670; Paul E. Chism, Jr., P.O. Box 1851, Decatur, Ala. 35602

[21] Appl. No.: 370,447

[22] Filed: Jan. 9, 1995

Related U.S. Application Data

[63] Continuation-in-part of Ser. No. 180,961, Jan. 11, 1994, Pat. No. 5,464,513.

[51] Int. Cl.⁶ ...................................................... C02F 1/46
[52] U.S. Cl. .......................... 204/164; 204/165; 204/176; 204/228; 204/270; 204/277; 205/687; 205/688; 205/701; 205/756
[58] Field of Search ........................ 204/130, 149, 204/164, 165, 176, 277, 228, 270; 205/687, 688, 701, 756

[56] References Cited

U.S. PATENT DOCUMENTS

| | | | |
|---|---|---|---|
| 2,585,103 | 2/1952 | Fitzgerald | 99/250 |
| 3,192,126 | 6/1965 | Fear | 196/46 |
| 3,223,747 | 12/1965 | Bohrer | 260/674 |
| 3,223,748 | 12/1965 | Bohrer | 260/674 |
| 3,498,457 | 3/1970 | Gough | 210/85 |
| 3,770,612 | 11/1973 | Gray et al. | 204/261 |
| 3,841,483 | 10/1974 | Overton | 210/87 |
| 3,922,241 | 11/1975 | Lewandowski | 210/223 |
| 4,169,029 | 9/1979 | Smirnov et al. | 204/149 |
| 4,655,909 | 4/1987 | Furuno | 210/90 |
| 4,758,319 | 7/1988 | Klinkowski | 204/182.3 |
| 4,761,208 | 8/1988 | Gran | 204/95 |
| 4,917,785 | 4/1990 | Juran | 204/164 |
| 4,957,606 | 9/1990 | Juran | 204/164 |
| 4,986,906 | 1/1991 | Dadisman | 210/169 |
| 5,026,464 | 6/1991 | Mizuno | 204/164 |
| 5,049,248 | 9/1991 | Muralidharw | 204/180 |
| 5,118,942 | 6/1992 | Hamade | 250/324 |
| 5,139,625 | 8/1992 | Tanaka et al. | 204/130 |
| 5,230,792 | 7/1993 | Sauska et al. | 210/97 |

*Primary Examiner*—Arun S. Phasge
*Attorney, Agent, or Firm*—Waddey & Patterson; Mark J. Patterson

[57] ABSTRACT

A liquid decontamination method and apparatus uses a series of pulsed electrical arcs across electrodes placed within a liquid stream which passes through a decontamination module. Sufficient energy is delivered by a pulse generator to the electrodes whereby lethal ultraviolet radiation and mechanical shock waves are created by the arcs within the decontamination module. A plurality of modules can be operated in parallel or in series to vary the capacity of the apparatus. Gas is injected through one of the electrodes to facilitate the generation of arcs within the liquid.

30 Claims, 19 Drawing Sheets

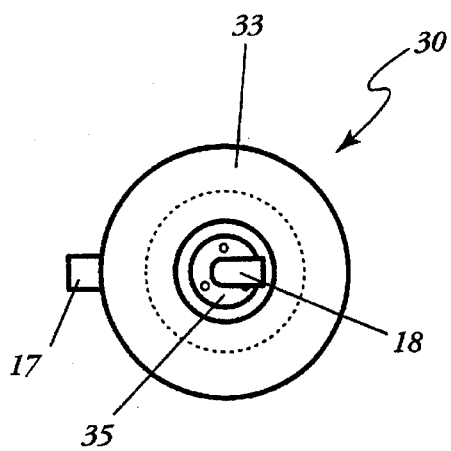
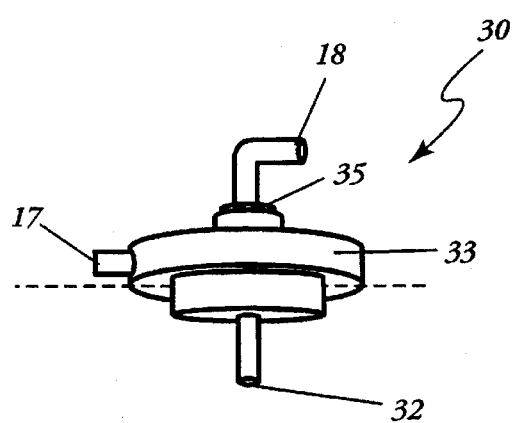
FIG. 6a  FIG. 6b
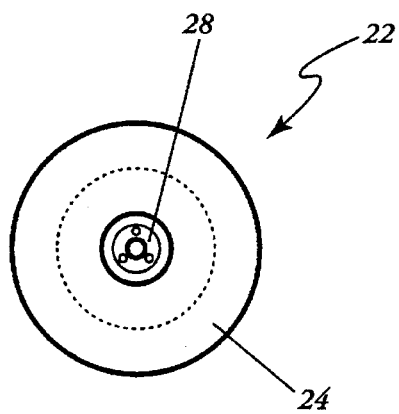
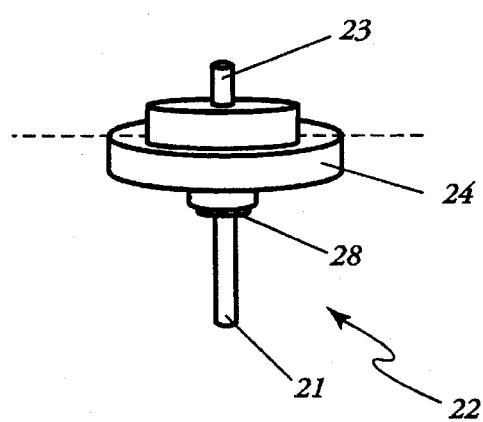
FIG. 7a  FIG. 7b

LIQUID DECONTAMINATION SYSTEM USING ELECTRICAL DISCHARGE WITH GAS INJECTION

This is a continuation-in-part of U.S. patent application Ser. No. 08/180,961 for a "Method and System for Water Decontamination Using Electrical Discharge" filed on Jan. 11, 1994, now U.S. Pat. No. 5,464,513. The owner of this application and the parent application, Scientific Utilization, Inc., claims benefit of the Statement Verifying Small Entity Status filed in the parent application, as such status is still proper.

BACKGROUND OF THE INVENTION

The present invention relates generally to methods and systems used in the purification and decontamination of water, sludge, and other liquids which contain toxic or undesirable chemicals and pathogens. More particularly, the system of the present invention pertains to liquid decontamination systems whereby the destruction and/or elimination of contaminants is initiated by an electrical discharge within a liquid stream.

A significant amount of research and development has been undertaken in recent years towards environmental clean-up operations, and in particular to the purification and decontamination of ground water, waste water, and drinking water. The need for decontamination of water can vary from the continuous treatment of industrial waste water to dealing with one-time contamination of water pools or ponds at a single location. Accordingly, methods are needed which are feasible on both a large and small scale.

A variety of techniques have been used in the prior art to destroy or remove contaminating and toxic materials in water supplies. These include the use of shock waves created by ultrasonic vibrations and exposing the water to ultraviolet radiation. Electricity has also been employed as a decontamination agent, such as by introducing positively charged ions into a water stream to cause coagulation and separation of particles, and by the passing of electric current within a fluid chamber whereby the current flow between the anode and cathode has a toxic effect on microorganisms nearby.

Chlorination is well known and effective in limiting bacteria and microorganisms but has little effect on organic chemicals. Conversely, activated carbon filters can remove organic chemicals but such filters are extremely costly and require regular maintenance.

The use of ozone ($O_3$) injection can also be effective. However, to be efficient, an ozonation facility must be extremely large. Therefore, its cost and size renders it unsuitable for use, for example, to clean up small contaminated ground water and waste water sites. Hydrogen peroxide injection systems have also been used, some with UV flash lamp activation, to create the —OH radicals necessary to combine with the organic compounds. This technique provides adequate cleanup of contaminates and organic chemicals but is costly because of the large requirement for high purity hydrogen peroxide and the need for regular maintenance due to the surface contamination of the UV flash lamps which prevents proper exposure of the hydrogen peroxide to the UV energy.

Activated carbon filters do an adequate cleanup job for organic chemicals but are extremely costly and must be changed regularly and thus do not promise to solve the problems on a national basis.

In a related problem, thousands of manufacturing industries nationwide must contend with a by-product, or side effect of production, that may be dangerous to the general public or the local environment. The production process itself may create organic chemicals or other contaminants that are harmful to the environment, and to humans. In the food industry, the problem is more frequently due to the fact that many food provisions attract, or take on, bacteria and/or biological organisms that are harmful if consumed. These pathogens (salmonella, virus, bacteria, etc.) pose a challenge for the manufacturer at some point in the production process, and before shipment to retail outlets. In most cases, the manufacturer will use a chemical disinfectant or utilize a process at the plant which will virtually eliminate the possibility of problems due to product contamination. This is good for the end consumers, but poses another problem for the environment if these disinfectants or chemicals are discharged from the plant into nearby bodies of water or landfills, which may leech into ground water systems.

There are many types of disinfectants and chemicals used in this type of processing. One of the most effective is phenol-based disinfectant. Phenol combats pathogens, and other harmful compounds, and is used widely by many various industries. The side effect to use of a phenol-based disinfectant is that it poses a threat to the environment because of its high Biological Oxygen Demand (BOD). This BOD competes for oxygen with other higher chain organisms when released into the environment. The Environmental Protection Agency (EPA) currently enforces a limit of 0.5 ppm daily average and 1.0 ppm maximum limit if discharging into the local environment. This concentration of phenol in the native environment apparently poses no threat to the natural food chain, and therefore is acceptable by government standards. However, many industries are either non-compliant with this regulation, or have no cost-effective alternatives for destroying the disinfectant before it is released into the environment. Therefore, many industries are installing in-house waste water treatment technology to keep their product safe for end users and for the local environment.

In the production of poultry breed stock, products, and eggs, many process farms and plants utilize phenol as a disinfectant. Some are enforcing a salmonella-free process which is unique to the entire industry. This process protects their employees and end consumers from possible salmonella contamination. Part of the process requires the use of phenol as a disinfectant for washing down equipment, machines, and the general facility. The wash down run-off water with the phenol by-product is often collected and discharged locally into a small body of water. This poses a problem because the concentration of phenol is typically beyond the allowable limits as set by the EPA for local discharge. A wash down volume of 8,700 gal/week with phenol concentration of 20 PPM or more is not unusual.

Another problem exists for the thousands of waste water processing plants in the USA which utilize some form of sludge de-watering equipment. The bulk of the waste treatment plants in the United States use biological processing or living organisms called "bugs" as a means of final processing of the waste water from the sewer systems or industrial processes. The end result is that the only solid matter remaining after the waste material processing are the "bugs" themselves. The water containing these bugs in the final processing tank is called sludge. The problem created by this means of waste processing is the fact that the remaining solid material must be removed and disposed of before the processed water can be recycled or expelled to a river or stream.

The limit to operating capacity is the de-watering rate. The cell structure of the organisms which comprise the sludge holds water and significant energy and time is required to remove this water. In many cases conventional treatment equipment can not remove a sufficient amount of water to allow the transfer of the processed sludge cake to a landfill without further drying. If the wet sludge is sent to a landfill rated for wet sludge type waste material then the disposal costs are much higher.

Many types of de-watering equipment exist to physically separate the solid material from the sludge. Examples include the belt press, the plate and frame press, and the centrifuge. Once the solid material is removed by this de-watering equipment, it must be disposed of in some manner. The primary approach is the transportation of this material to a land fill. The limitations to this approach are the time and energy required to physically remove the water and the dryness of the compressed material or "cake" after the de-watering process. If the de-watering step is too slow, then extra equipment must be employed to process a certain flow rate of sludge. If the cake is not dry enough, the material must be further processed or disposed of in a special landfill which costs much more to utilize. If a landfill can be found to accept the wetter cake, then there is a significant increase in cost associated with transportation of the heavier material due to the additional water that was not removed. The net result is, if the de-watering rate could be doubled, a given volume of sludge could be processed in half the time with half as much de-watering equipment. If the cake could be dryer, then all the solid material could be disposed of at minimum cost. Such a process would save significant amounts of capital equipment and operating costs.

What is needed, then, is a liquid purification and decontamination system which can effectively destroy or remove a variety of organic materials and chemical toxins at relatively low cost, which does not require the addition of other chemicals or further processing of the contaminated water, and which can be adapted for use in both large and small scale operations. What is also needed is sludge treatment process which can solve both the de watering rate problem and the dryness of the cake problem with a single operation. Such a system is presently lacking in the prior art.

SUMMARY OF THE INVENTION

One object of the present invention is to provide a system and method of liquid decontamination which is effective both on bacteria and other microorganisms as well as on organic chemicals.

Yet another object of the present invention is to provide for a method and system of liquid purification which can both be cost effective and efficient whether being operated on a large or small scale.

A further object of the present invention is to employ a liquid purification system which concurrently implements several different modes of decontamination actions but without adding complexity to the system itself.

Yet another object of the present invention is to supply a decontamination system which can be used to treat water and sludge at a lower cost.

To achieve these and other objectives, the system of the present invention uses a synergistic combination of ultraviolet radiation, pulsed mechanical shock waves, and ionization of the liquid stream, as decontamination and purification actions within the liquid to be treated. The liquid to be decontaminated is directed through one or more decontamination modules arranged in series or parallel. A pair of electrodes extend transversely across and through a chamber within the module, defining therein an arc gap or electric discharge area. Contaminated liquid is introduced into the chamber and module through an intake where it passes through or proximate to the discharge area. A pulse generator utilizing a high energy solid state switch delivers a rapid sequence of arc inducing electrical pulses across the electrodes, thereby producing a series of electric discharge arcs in the discharge area between the electrodes. The arcs are of sufficient energy whereby a plasma inducing arc is sustained through the liquid across the electrodes, generating lethal levels of ultraviolet radiation as well as mechanical shock waves having the capacity of directly killing microorganisms and weakening others. Further, molecules of water proximate to the discharge area are broken down into excited radicals, including hydroxyl ions and free oxygen, which combine with organic chemicals to eliminate them from the water stream.

To enable the generation of arcs between the electrodes, gas is injected through the anode assembly into the electrical discharge area. Further enhancements to a low flow batch water treatment embodiment of the system include pumping hydrogen peroxide into a pre-processing holding tank prior to arc discharge treatment and enhancement of ozone distribution through the liquid prior to entering a post-processing tank.

The system herein described represents a major scientific breakthrough which offers all of the primary purification/decontamination effects ( UV, $O_3$, OH, $O_2$, shock, electrical kill) of the other techniques in single approach providing a synergistic result not achieved by any other systems.

BRIEF DESCRIPTION OF THE DRAWINGS

FIG. 2 is an end view, looking through the decontamination module of the embodiment of the invention of FIG. 1a.

FIG. 6a is a plan view of the cathode assembly used in the decontamination module of the waste water treatment system of FIG. 4.

FIG. 6b is a side view of the cathode assembly of FIG. 6a.

FIG. 7a is a bottom view of the anode assembly used in the decontamination module of the waste water treatment system of FIG. 4.

FIG. 7b is a side view of the anode assembly of FIG. 7a.

FIG. 13a is an enlarged perspective view of the dual electrode chamber of FIG. 12.

FIG. 13b is an enlarged view of the anode and cathode assemblies of the embodiment of the sludge decontamination system of FIGS. 9 through 12, showing their respective orientations as mounted in the chamber of FIG. 13a.

FIG. 14 is a side view of the chamber of FIG. 13a.

FIG. 16 is a top view of the chamber of FIG. 13a.

FIG. 19b is a plan view of the electrode clamp of FIG. 19a.

DESCRIPTION OF THE PREFERRED EMBODIMENT

Basic Decontamination Method

Figure 1A:
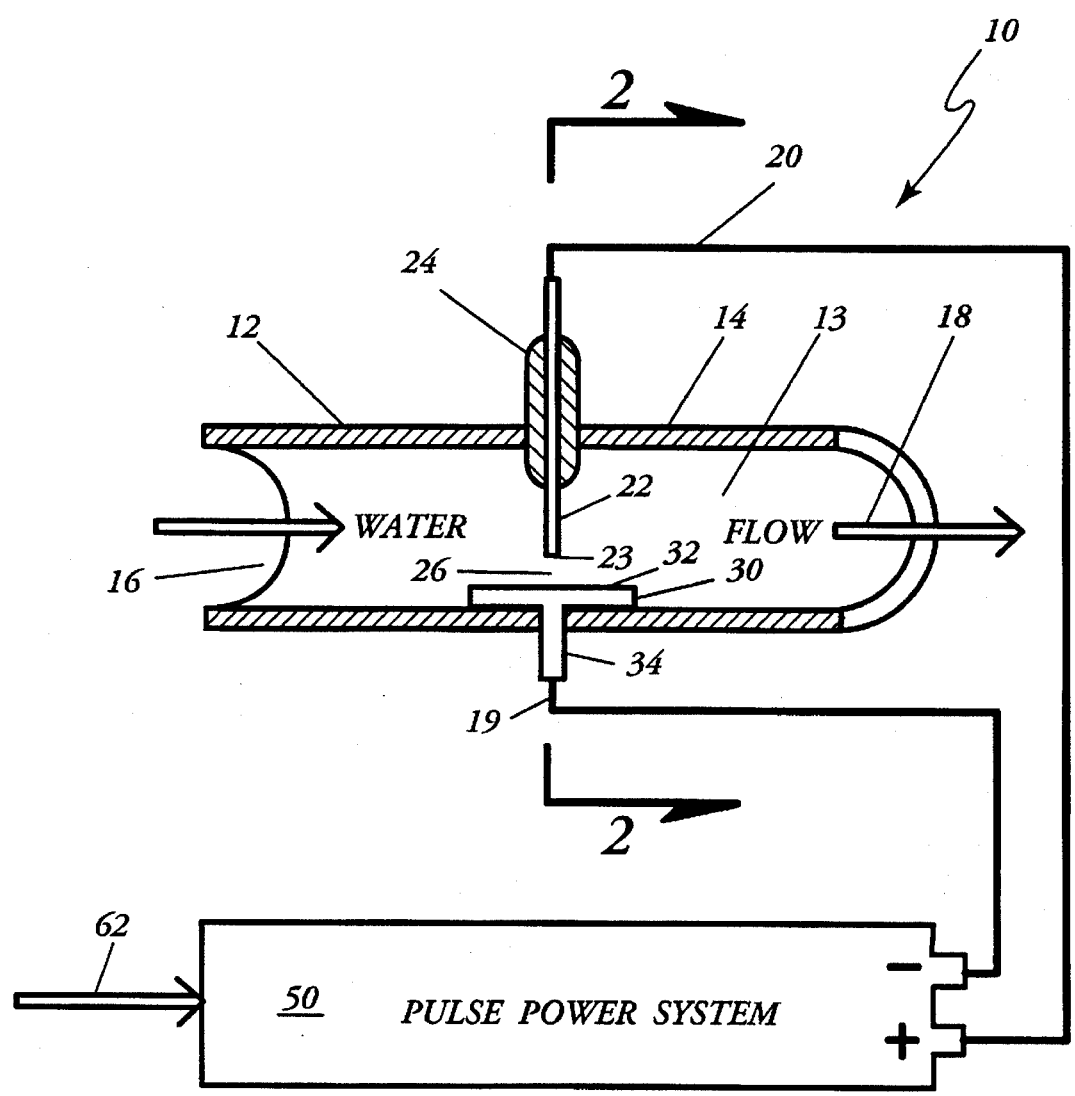
FIG. 1a is a schematic representation of a first embodiment of the liquid decontamination system of the present invention with a decontamination module shown in a cut-away view.

The liquid decontamination method of the present invention uses three distinct modes of purification and decontamination of water or other liquid, which combine in a synergistic manner to remove or destroy organic materials and chemical toxins. The event which initiates each of these distinct decontamination modes is a series of pulsed electrical arcs which are produced within the liquid stream. Using a discharge voltage of between 10 kV to 50 kV, with a peak arc current of 70A, a plasma effect is created in the decontamination chamber proximate the arc discharge area. The immediate result is a localized temperature of 10,000 to 15,000 degrees K and localized plasma pressures of between 100 to 1000 MPa. As a first consequence of the discharge, the arc itself generates high levels of ultraviolet radiation which is destructive of many living organisms found in water streams. Second, the high temperature causes a rapid expansion and then cooling of the ambient water, producing a mechanical shock wave within the decontamination unit and resulting in both immediate destruction of many bacteria and microorganisms, as well as the breaking down of protective shells and membranes of others, thereby exposing them to ultraviolet radiation or other lethal effects. Thirdly, the electrical discharge breaks down the water itself into hydrated electrons, ions, and excited free radicals, including H, OH, $HO_2$, and $O^+$. These radicals directly attack the bacteria and viruses and then combine with the organic chemicals to eliminate them, similar to the previously mentioned hydrogen peroxide and ozone injection systems.

Thus, the significant event in the method is the creation of a high energy electrical arc within the water. A system 10 which will create such an arc is shown generally on FIG. 1a. The decontamination and purification effects take place within one or more decontamination modules 12 through which the ground, waste, or drinking water passes during the decontamination process. In a preferred embodiment, module 12 has a generally cylindrically shaped chamber wall 14 which, in conjunction with water intake 16 and water discharge port 18, will define therein a fluid containing decontamination chamber 13. In this first embodiment of system 10, decontamination module 12 will preferably be constructed of Lexan® plastic material, with an inside diameter of approximately 3 cm.

Mounted transversely on opposing sides of wall 14 are arc inducing electrodes in the form of an anode assembly 22 and cathode assembly 30. Anode assembly 22 includes an anode electrode member 23 (FIG. 2), preferably made of tungsten, having a generally cylindrical shape, approximately ⅛ inch in diameter, terminating in a point. Anode assembly 22 will be supported as it enters and passes through chamber wall 14 by insulator 24, made of Teflon® PTFE, and mechanically adapted for easy removal of anode assembly 22 and for adjusting its position within chamber 13.

Cathode assembly 30 will have a generally rectangular arcing plate or cathode electrode member 32 which is substantially longitudinally aligned with and proximate to the inner surface of wall 14. Extending perpendicularly from the distal end of cathode electrode member 32 is an electrical terminal 34 of cathode assembly 30. A fluid retaining seal (not shown) will be placed around terminal 34 in a conventional manner to prevent the release of contaminated water from within module 13.

Figure 2:
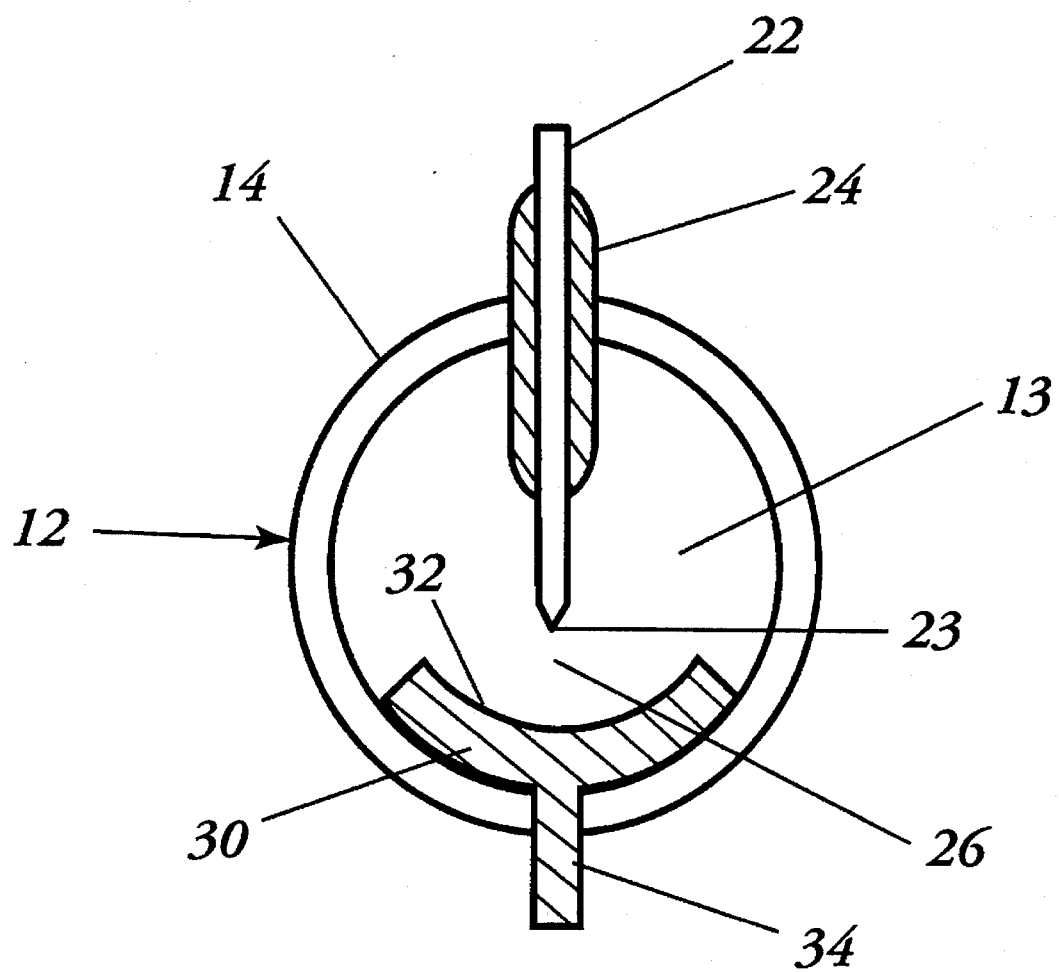

As seen on FIGS. 1a and 2, an arc discharge area 26 is defined between the flat surface of cathode electrode member 32 and the proximal end of anode electrode member 23. The length of this discharge area 26, or distance between the proximal pointed end of anode electrode member 23 and the proximal end of cathode electrode member 32, is critical to the proper operation of the decontamination system 10. The spacing should be maximized for optimum flow rate, consistent, however, with the ability to produce and sustain a reliable electrical discharge and arc 27 between anode electrode member 23 and cathode electrode member 32. In a preferred embodiment of the system, the length of discharge area 26 will be approximately 1.0 cm.

Anode electrode member 23 is the only part of the system which requires periodic replacement. Therefore, use of a highly durable material in manufacturing the anode assembly is important. Metals found acceptable for use in manufacturing anode electrode member 23 include tungsten thorium alloy and chromemolly alloy.

Cathode electrode member 32 can be made of any durable metal which is suitable for long-term operation, stainless steel, for example. Cathode electrode member 32 of cathode assembly 30 should be approximately 2 cm by 2 cm, with a thickness of 0.2 cm.

To create an arc 27 between anode electrode member 23 and cathode electrode member 32, anode assembly 22 is connected to pulse generator 50 (FIG. 1) by means of positive cable 20. A negative cable 19 is connected also from terminal 34 of cathode assembly 30 to the negative side of pulse generator 50.

Figure 3:
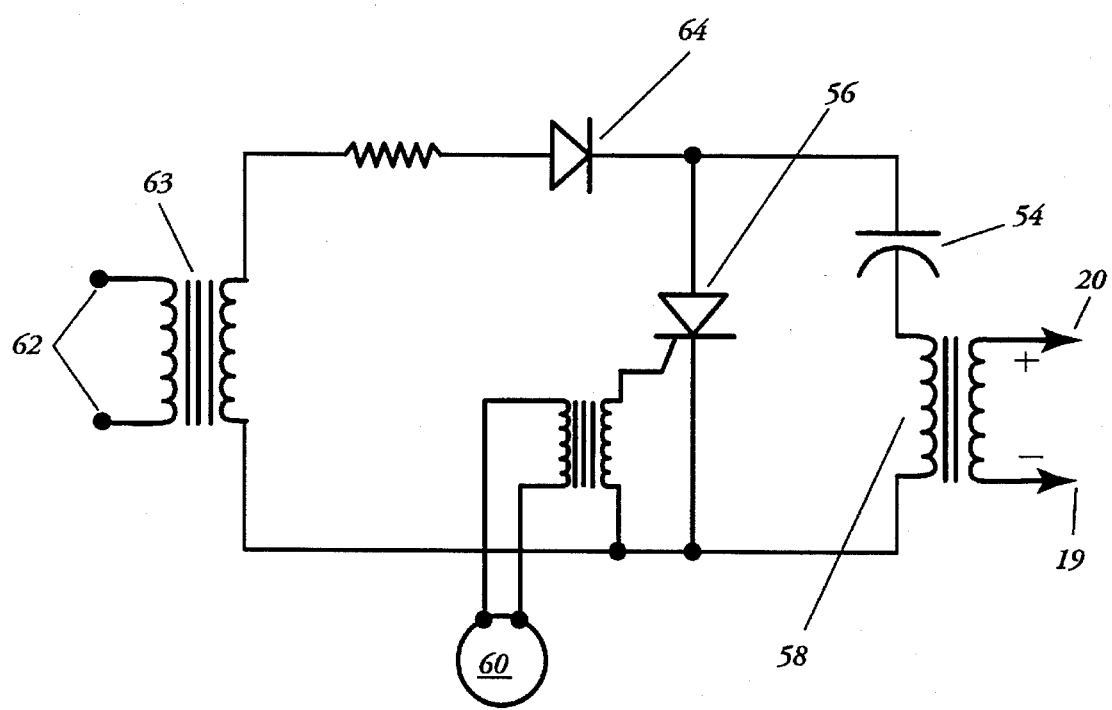
FIG. 3 is a schematic diagram of the pulse generator of the embodiments of FIGS. 1a or 1b.

To achieve the objective of repetitive generation of shock waves within chamber 13 of decontamination module 12, as a consequence of generation of the arc 27, means for pulsing the arc are used. Looking now at FIG. 3, further detail is provided regarding the design of pulse generator 50. Preferably, pulse generator 50 will be of the capacitive discharge type, having a discharge capacitor 54 with a capacity of approximately forty microfarads and rated at 3,500 volts. Capacitor 54 is discharged by means of high power solid state switch 56, which is designed and selected such that it can discharge the capacitor into output pulse transformer 58 in one microsecond.

In order to produce a sufficiently high energy electrical arc 27 at discharge area 26, pulse transformer 58 must be capable of producing a 40,000-volt, 30-amp pulse at anode assembly 22, based on a 1,500-volt, 1,100-amp pulse from discharge capacitor 54. Thus, in a preferred embodiment, semiconductor switch 56 must receive a triggering signal from electronics timing board 60, which contains circuitry capable of producing between one and sixty triggering signals per second. Discharge capacitor 54 is charged to 1,500 volts DC in several milliseconds, through resistor 61 by first stage transformer 63 and rectifier unit 64, which is connected to a conventional 220 VAC power line 62.

In one preferred embodiment of the apparatus, timing board 60 will cause the production of thirty arcs per second across discharge area 26 at a peak power level of 1.2 megawatts. The pulse width of the arcing signal is approximately five microseconds, providing an energy level of approximately 7.0 Joules per pulse with an arc gap or discharge area 26 distance of approximately of 1.0 centimeters.

The flow rate of water through module 12 can be adjusted to varying levels, depending on the energy requirements per volume of water for a preferred amount of decontamination and purification effects. In one preferred embodiment, an energy density of 1.0 J/cm$^3$ of water will provide adequate decontamination, thereby allowing a flow rate of approximately twelve liters per minute through module 12.

It will be apparent to those skilled in the art that the dimensions and volume of module 12 can be proportionally adjusted in accordance with the type of water to be purified and the needed flow rate. Further, to increase decontamination capacity, a plurality of modules 12 can be concurrently operated in parallel, from a single contaminated water supply emptying into a unitary discharge. Also, to enhance the amount of decontamination effects, a plurality of modules 12 can be operated in series, whereby purified water leaving the discharge port 18 of the first module 12 will then feed immediately into the intake 16 of a second module 12, and so on.

Based on tests of a prototype system implementing the methods and apparatus described herein, purification levels of 99.5%, suitable for drinking water, can be achieved using an energy density of 3.5 J/cm$^3$ or 1 KWH/M$^3$. To meet standard environmental requirements, that is to achieve a purification level adequate to allow release of the treated water into the environment, a power density of 0.3 KWH/M$^3$ is adequate.

Further testing of a preferred embodiment for the removal of common organic chemical contaminants showed that reduction of such contaminants occurs at an arc energy level of between 10–30 J/cm$^3$ occurs, whereby a 90 to 95% reduction in contaminants was obtained for pesticides from an initial concentration of 0.1 grams per liter, for hydrocarbons from 0.1 to 40 grams per liter, and for oil products from between 0.2 and 20 grams per liter.

Gas Injection

Figure 1B:
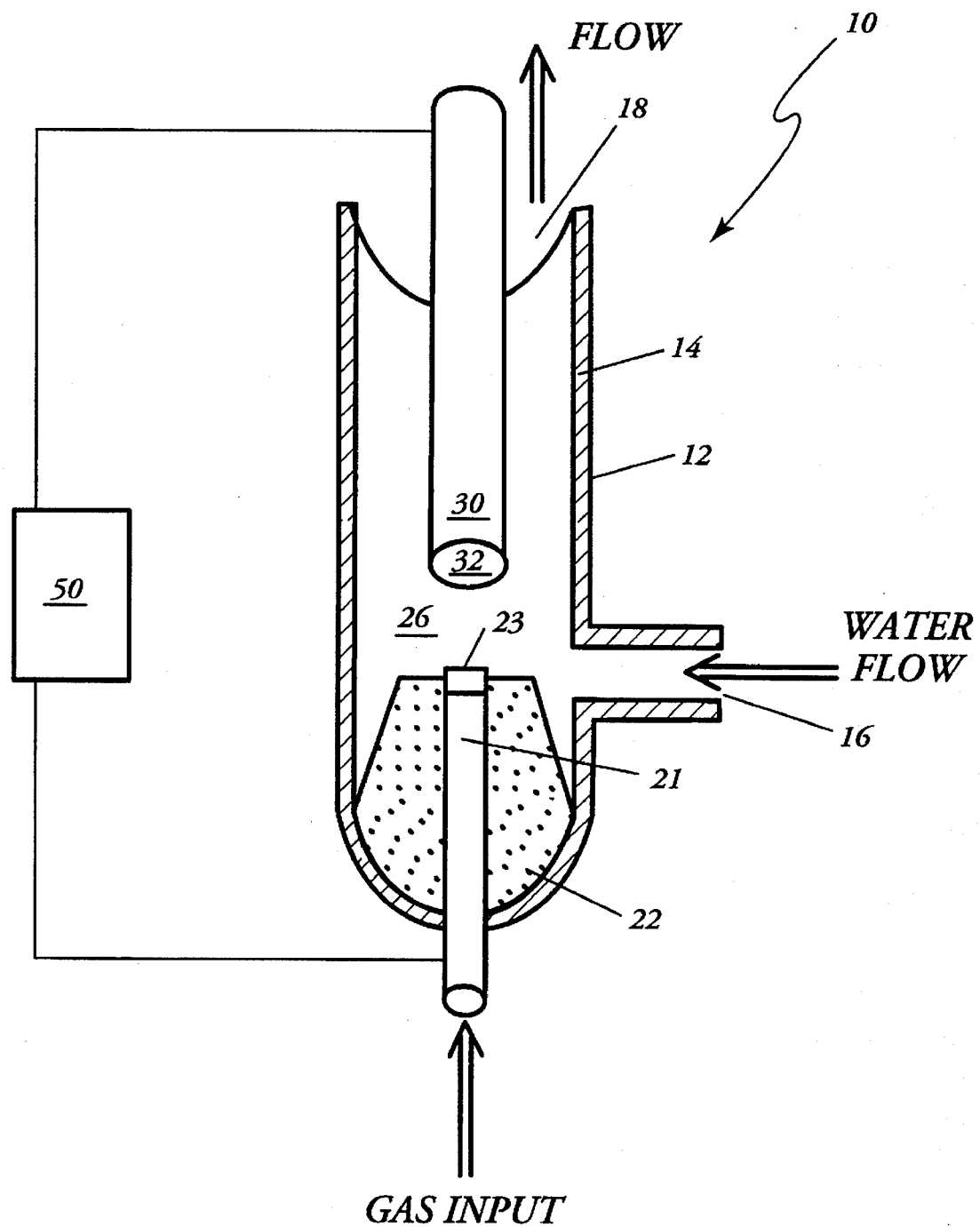
FIG. 1b is a schematic representation of a second embodiment of a liquid decontamination system which includes gas jet injection, with the decontamination module shown in a cut-away view.

To enable the generation of the desired electrical arcs within the liquid, gas should be introduced into the arc discharge area 26. Referring to FIG. 1b, a high pressure gas jet 21 is therefore incorporated into anode assembly 22 of the preferred second embodiment of system 10. A submerged gas jet channel is formed by the injection of high pressure gas through a small orifice in the anode electrode member 23 directed toward the cathode assembly 30. This air or gas channel forms a virtual anode and becomes the path through which the initial arc occurs. This occurs because air or most gasses have a much lower breakdown voltage than does water.

The contaminated water to be purified flows through the electrical discharge chamber 13 and proximate the discharge area 26. The flow rate of water being purified is a function of energy requirements per unit volume. Assuming a conservative number of 1.0 joule per cubic centimeter, the flow rate would be 12 liters per minute. Preferably, gas will be supplied at a flow rate of approximately 5 CFM, at a pressure sufficient to sustain generation of gas bubbles within the liquid. A gas pressure of approximately 6–8 PSI above the pressure of the liquid within the chamber 13 will normally be adequate.

The pulse generator 50 in this embodiment is also a capacitive discharge unit designed to deliver a very fast pulse of high voltage and current to the electrodes in chamber 13. The discharge capacitor 54 (FIG. 3) is a 40.0 microfarad impulse discharge type designed for 3500 volts. Capacitor 54 is discharged by use of a high power solid state switch 56 with a sufficient di/dt and peak current capability to discharge the capacitor 54 in approximately 1.0 microsecond into the output pulse transformer. The output pulse transformer is designed to produce a 40,000 volt, 70 amp impulse into the virtual anode electrode member 23 formed by the high pressure submerged gas jet 21 so as to produce an intense electrical discharge in the discharge area 26. The input required for this output from the pulse transformer 58 is a 1500 volt, 1100 amp pulse from capacitor 54 and the switch 56. The switch 56 receives its signal to switch from an electronics timing board 60 capable of 50 to 100 pulses per second. The pulse discharge capacitor 54 is charged to 1500 volts DC in a few milliseconds by power transformer 63 and rectifier 64 gaining its power from power line 62. The design of pulse power system 50 must also include the necessary transient protection features required by conventional engineering practice to protect switch 56 from early failure.

The pulse power system 50 will produce the required high energy discharge or arc 27 in the discharge area 26. This discharge occurs approximately 60 times per second at a peak power level of 1.2 megawatts. The pulse width is approximately 5 microseconds (full width half max) giving an energy level of 7.0 joules per pulse. The gap spacing is approximately 2.0 cm between the proximal ends of the anode electrode member 23 and cathode electrode member 32 forming the discharge area 26.

The chamber 13 is partially filled with energetic plasma as a result of an intense pulsed electrical arc 27 through the gas or air channel. This gas channel is submerged in the working fluid (water) being purified. The dimensions of the chamber 13 are a function of the total average discharge energy necessary to give the desired degree of purification and the flow rate of the water being purified or decontaminated through the chamber. The localized plasma pressure ranges between 100–1000 MPa, and the localized temperature is approximately 10,000 to 15,000 K.

Once the arc 27 is completed in the cold gas channel, it quickly expands and then contracts as it cools very rapidly. This is results in the creation of differential pressure waves, which are seen as shock waves within the chamber 13. The shock wave is one of the initial effects that begins the purification process by direct kill of certain micro-organisms and bacteria and by breaking down the external protective shell seen on many viruses and bacteria. The electrical arc which produces the shock wave also produces a highly concentrated plasma. This plasma is a very powerful source of ultra violet (UV) radiation, which in itself destroys many of the bacteria and viruses as well as creating some of the excited radicals needed to transform the chemical contaminates/toxins. The plasma also transforms the oxygen in the cold gas channel into ozone which is a very powerful oxidizer and is well known and accepted as a reliable approach to water purification.

Another primary effect of the electric arc is the generation of hydrated electrons, ions and excited radicals like H, OH, $HO_2$, $H_2O_2$ and others. These radicals can directly attack the bacteria and viruses and transform the chemical toxins in a very efficient manner. This part of the purification process works much like the existing $H_2O_2$ (hydrogen peroxide) injection systems which use UV to break down the $H_2O_2$ into the necessary excited radicals but at a much reduced cost. Also, the synergism with the other effects (Ozone, UV, plasma, and shock) results in a much higher quality of purification.

A prototype system 10 was constructed and the effectiveness of the approach tested. The bactericidal impact was tested with *E. Coli* bacteria. When highly contaminated water was run through the system 10 during the test the *E. Coli* was significantly reduced or eliminated. The power efficiency of the system was also determined during these tests. The degree of the purification of the waste water was compared to the total power consumed and the power efficiency was determined. The following data shows the results of the purification test and the power consumption required to get that result.

POWER CONSUMPTION TO MEET DRINKING WATER REQUIREMENTS

W=3.5 $J/cm^3$(1 $kWh/m^3$)—For purification to the standard of drinking water (99.5%)

POWER CONSUMPTION TO MEET ENVIRONMENTAL REQUIREMENTS

W=1 $J/cm^3$(0.3 $kWh/m^3$)—For a purification level meeting the standards for dumping into the environment.

The chamber 13 within module 12 contains the cathode and anode assemblies 30 and 22 where the high voltage, high current arcs occur. A single chamber 13 can contain one or more discharge areas 26 defined by one or more paired cathode and anode assemblies 30, 22 or multiple anode assemblies 22 paired with a single cathode assembly 30. System 10 can contain one or more modules 12 configured in series or parallel, whose number and configuration is determined by the rate of the water flow and level of purification required for a single pass through the system 10. The dimensions of chamber 13 are based upon the flow rate of water through the chamber 13 and the mechanical resonance of the chamber 13 due to the shock waves created by the electrical arc.

Hydrogen Gas Injection

The intense arc generated by the system 10 breaks many water molecules into hydroxyl ions and free hydrogen. The ions act as a strong oxidizer and combine with organic hydrocarbons in the water to form carbon dioxide which can be released into the atmosphere. Unfortunately there are cases where the oxidation process is undesirable due to an unacceptable by-product being produced. In this case the oxidants can be avoided or eliminated and a different effect emphasized.

The arc is very hot, approximately 15000 degrees K, which in itself kills any living organism or breaks down most chemical compounds with which it comes into contact. This effect is enhanced if hydrogen is injected into the arc, or dissolved in the water before it passes through the arc, because the hydrogen combines with any oxidant to form water or hydrogen peroxide, thereby eliminating the possibility of further oxidizing existing elements or compounds. The process is so effective that it can reduce an oxidized element to its base form with water as the final by-product.

Two examples of chemical compounds that can be reduced to their base elements by electrons from this high temperature arc are potassium bromate and chloroform. Potassium bromate is a dangerous cancer causing agent that is produced when bromine is an element in water that is purified by ozone. Oxidizing the safe element produces an unsafe compound.

Hydrogen Peroxide Injection

One approach to water decontamination taken in the prior art is the addition of hydrogen peroxide. This process uses hydrogen peroxide ($H_2O_2$) and a UV flash lamp to produce —OH radicals. These radicals combine with any organic chemicals present to effectively burn the chemicals yielding carbon dioxide ($CO_2$)as the final product. Recent reports about this approach indicate that the amount of hydrogen peroxide required is much higher than first thought. In the real world hydrogen peroxide is added as a pre-treatment before the exposure to the UV to reduce the turbidity of the water because UV will not travel through cloudy water. Hydrogen peroxide is added until the mixture has a ph of near 5.5. This requires as much as 10–15% hydrogen peroxide. The pretreatment is a hidden cost which is not normally added to the cost per gallon number published. The prior art system performs the function of removing organic chemicals from a water supply, but the cost is high. The major drawback in the hydrogen peroxide and UV flash lamp process is the fact that the flash lamps quickly plate over and become ineffective. This is especially true in areas where there is a high dissolved metals content such as iron. It became evident that the system of the present invention inherently solves this problem because the arc produces UV directly and there is no glass envelope to become fouled by the dissolved metals. In fact, the new system can be enhanced by injection of a gas such as argon into the arc to increase the UV output. This is equivalent to having a UV flash lamp with no glass envelope. Since UV is required to kill pathogens, this injection of a UV enhancing gas also applies to the bacteria and virus (*E. Coli*) killer.

The system of the present invention can also utilize hydrogen peroxide injection, enhanced by the electrical discharge process, to cream a synergistic effect which combines the electrochemical breakdown of hydrogen peroxide by UV into —OH radicals (which react with organic compounds) with electrical shock, UV radiation, ion generation, and mechanical shock. These effects are initiated/created by the high energy electrical discharge in conjunction with small amounts of injected hydrogen peroxide.

The electrical arc and hydrogen peroxide injection produces high levels of UV radiation which has previously been shown to kill living organisms. Activation of the injected hydrogen peroxide directly by the UV produced by the arc significantly reduces the requirement for hydrogen peroxide and preventing any possibility of lamp contamination or failure, as found in prior art systems.

The electrical discharge breaks down the water itself into excited hydroxyl ions and free oxygen which combines with the organic chemicals to eliminate them in the same manner as does the hydrogen peroxide alone. The small amount of hydrogen peroxide injected breaks down, when exposed to high levels of UV, into —OH radicals which works in a synergistic manner with the electrical effects thus reducing contaminates to near zero.

Similar enhancement can be obtained by injection of titanium dioxide which is then catalyzed by UV radiation. This will increase the level of hydroxyl ions in the untreated water. Further, the inner wall surfaces of chamber 13 can be coated with titanium dioxide for similar effect.

Low Flow Batch Treatment of Waste Water

FIGS. 4–8 illustrate a third embodiment of the liquid decontamination system of the present invention which has been configured for low flow batch treatment of waste water. In this embodiment, the water is treated in three separate stages, first in pre-process tank 40, then in decontamination module 12, followed by post-process tank 41. Storage tank 76 is used to hold hydrogen peroxide which is injected into the waste water stream at pre-process tank 40. The purpose of the hydrogen peroxide (or similarly acting compound) is to increase the level of excited radicals which can directly attack bacteria and viruses. A water recirculation system, including recirculation pump 82, recirculation line 84, and check valve 83, recirculates the water after it enters module 12 to extend the time during which the decontaminated water is exposed to UV radiation generated by the arcs in chamber 13 module 12. Air to be injected into chamber 13 through the anode assembly 22 is supplied to module 12 from air tank 88, which is filled by compressor 90. Filter 91 removes particulates from the air and switch 89 cycles the compressor 90 on and off in response to air demand. Regulator 87 maintains the pressure of the gas at the preferred level above process pressure in module 12 so that a constant supply of gas bubbles is available in the arc discharge area.

After the water leaves module 12 at discharge port 18, it flows through module discharge line 92 and passes through ozone tower 93. While the water is in tower 93, distribution plate 94 breaks down the gas bubbles in the water to encourage the release and distribution of ozone which is generated by the arcing in module 12. The water then moves into post-process tank 41. From there, it is pumped out by dump pump 97 through treated water discharge line 100. Post-process tank low level float switch 98 is activated when post-process tank 41 is emptied.

When system 10 is operated, site holding tank 15 is filled with decontaminated water and storage tank 76 is filled with peroxide. This places storage tank low level float switch 77 in the "on" position. Pre-process tank 40 and post-process tank 41 are empty. Sump pump enable switch 112, drain enable switch 111, arc enable switch 110, peroxide pump enable switch 120, alarm enable switch 117, and compressor enable switch 118 are switched to their respective "on" positions. When arc enable switch is "on", arc enable relay 114 is closed. Peroxide pump enable switch 120 closes relay 125. If site tank 15 is full, float switch 43 is on. Power is then applied through pre-process tank low level float switch 71. This latches relay 101 (FIG. 5), turning on sump pump 42 and peroxide pump 79. Untreated water flows through raw water line 45, passing through screen filter 44. Peroxide then flows through peroxide supply line 78, through check valve 80, peroxide flow control valve 81, and into pre-process tank 40 at input 48. After a pre-determined period of time set by the user of system 10 using timer 102, peroxide pump 79 is turned off. When float switch 108 senses that pre-process tank 40 is full, it unlatches relay 101, thereby turning off sump pump 42 and applying power to solenoid operated air valve 85. When air flow switch 86 senses that air is flowing into module 12, power is supplied to flow buss 105.

Figure 5:
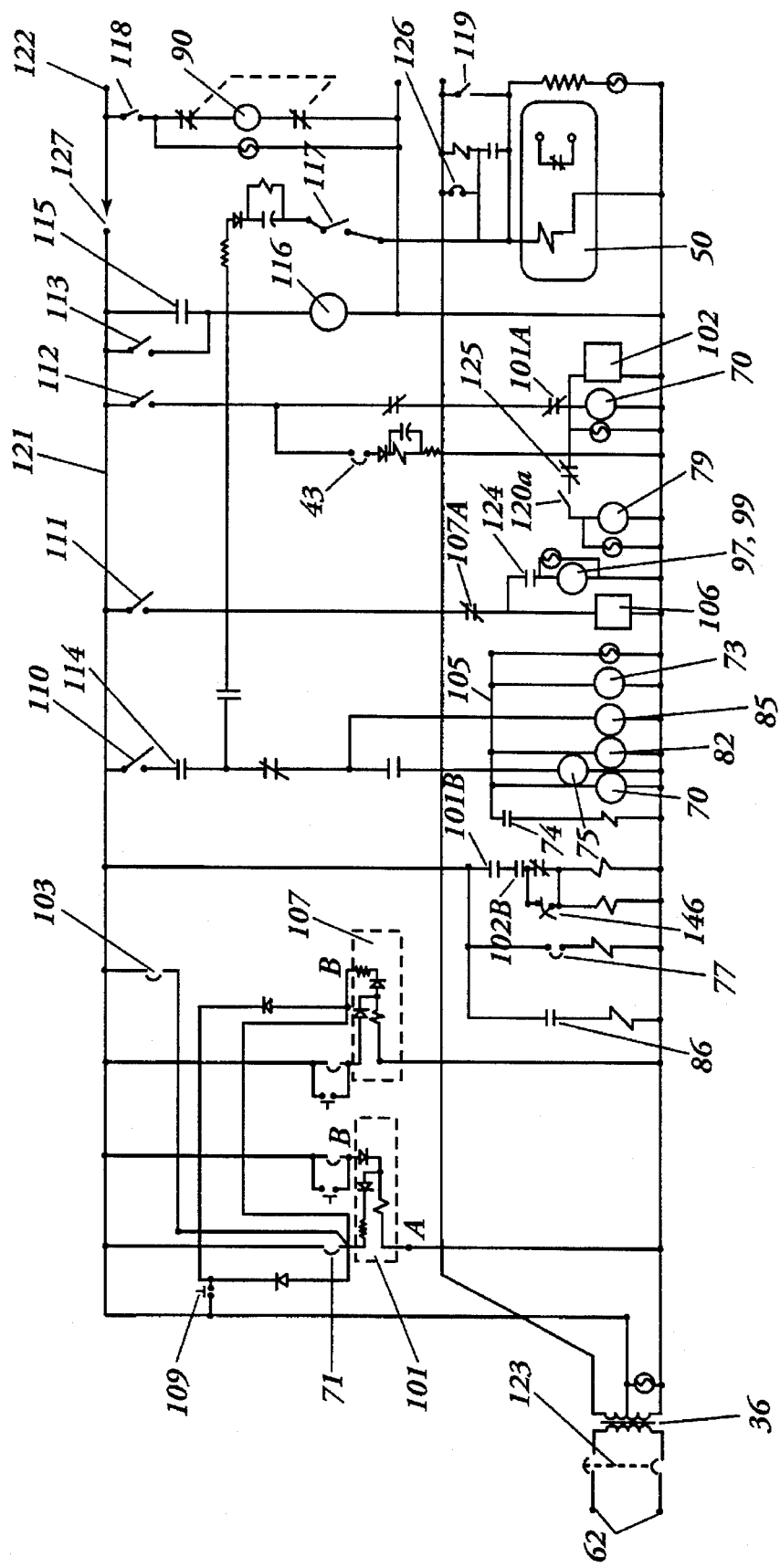
FIG. 5 is a schematic representation of the electrical system and components of the low flow batch waste water treatment embodiment of the system of FIG. 4.

When power is applied to flow bus 105, pre-process tank pump 70 and recirculation pump 82 are activated and water flow valve 73 is opened. Movement of water through pre-process tank discharge line 72 causes water flow sensor switch 74 to sense that water is flowing from module 12, thereby activating pulse power unit 50 (FIG. 5).

Water flows from module 12 through ozone tower 93, post-processing tank input line 95 and into tank 41. A portion of the water in module 12 is circulated through recirculation line 84, check valve 83, and recirculation pump 82 to increase UV exposure. When tank 41 is full, post-processing tank high level float switch 103 removes power from pulse unit 50 and flow buss 105. Holding timer 106 then starts. When timer 106 completes its cycle after approximately eight minutes, timer relay 124 closes. Latching relay 107 is closed and solenoid activated dump valve 99 opens and dump pump 97 begins to empty tank 41. Treated water is then discharged from the system through discharge line 100.

At the time that holding timer 106 is energized, latching relay 101 is also energized to begin the cycle again. After the initial cycle, pre-process tank 40 will fill up as post-process tank 41 empties.

Pre-process and post-process tanks 40, 41 are provided with vents 47 and 96 respectively to allow for the escape of air and other gases from system 10. Also, an air bleed line 49 runs from waste water recirculation line 84 to pre-process tank 40 to remove excess gases from module 12.

In some applications of system 10, a booster pump 75 can be used in discharge line 72 to maintain an adequate flow of waste water from pre-process tank 40 to module 12.

Figure 4:
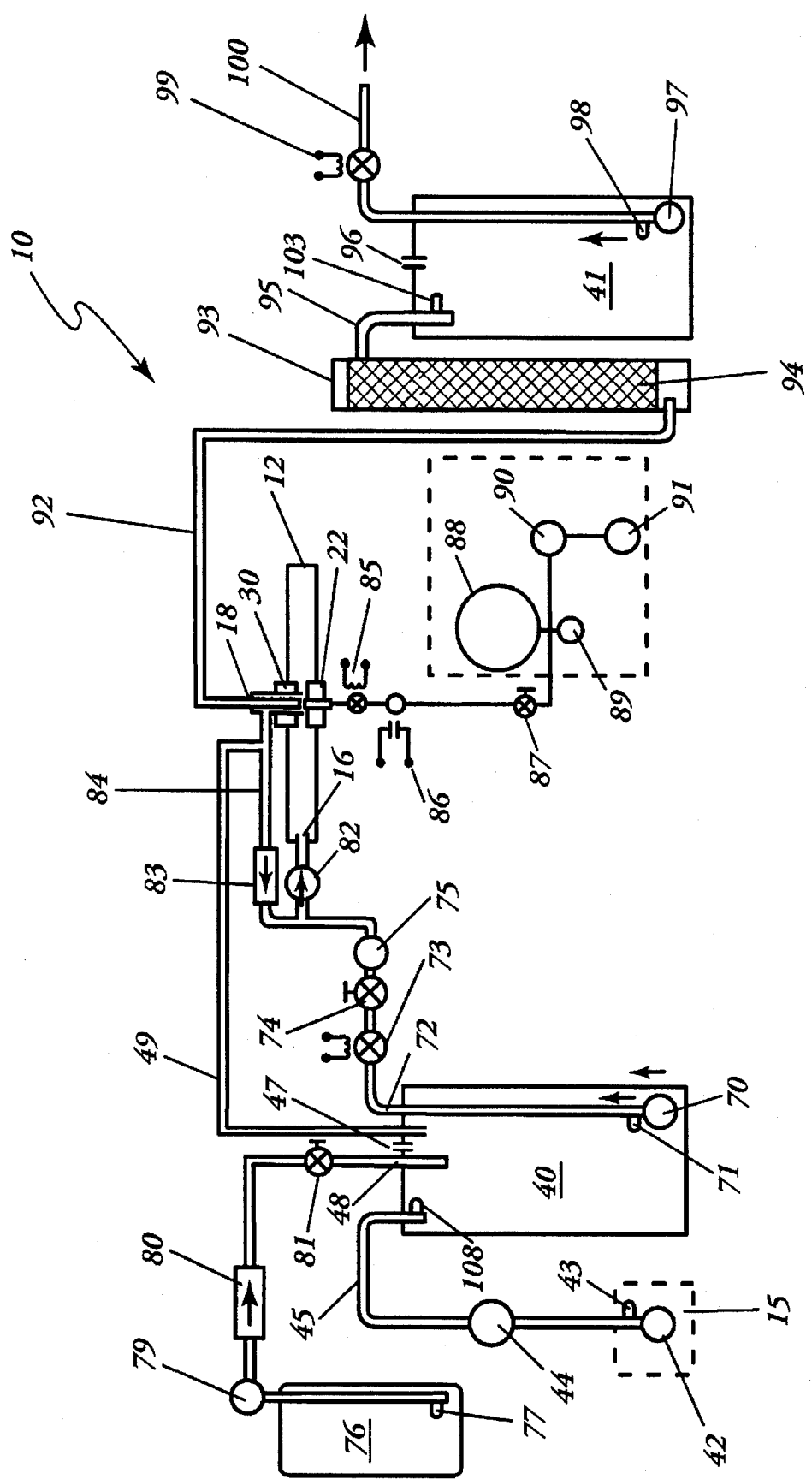
FIG. 4 is a schematic representation of the plumbing system and components of a third embodiment of the liquid decontamination system configured for use in the low flow batch treatment of waste water.

FIG. 5 is a schematic representation of the control system used to control pulse generator 50 as well as the various valves and other components illustrated on FIG. 4. Conventional 220 volt AC power supply 62 is connected to the system 10 through main breaker 123. Main power transformer 36 then provides 120 VAC power to buss 121 and 220 VAC power to buss 122. Buss 121 is protected by circuit breaker 127 while buss 122 is protected by breaker 126. Pre-process tank low level switch 71 (assuming that pre-process tank 40 is empty) causes relay 101 to latch and turn on sump pump 42 and peroxide pump 79. Timer 102 allows peroxide pump 79 to run for approximately 20 seconds, then turns it off. The duration of operation of peroxide pump 79 is adjustable by the user. When pre-process tank high level float switch 108 senses that pre-process tank 40 is full, it unlatches relay 101. This turns off sump pump 42 and applies power to solenoid controlled air valve 85. When air flow switch 86 senses that air is flowing to module 12, power is applied to process flow power buss 105. Application of power to flow buss 105 activates pre-process tank pump 70 and recirculation pump 82 and opens waste water flow valve 73. This allows entry of waste water to move from pre-process tank 40 into decontamination module 12.

An alarm system 116 is provided to detect the absence of arcing in module 12 or other unusual process condition. In the event of an alarm condition, the user has the option of overriding alarm relay 115 by using override switch 113. Otherwise, after the alarm condition is corrected, the system 10 can be reset using reset switch 109. A power interlock override switch 119 allows the user to operate system 10 while the system cabinet door (not shown) is open.

Figure 8:
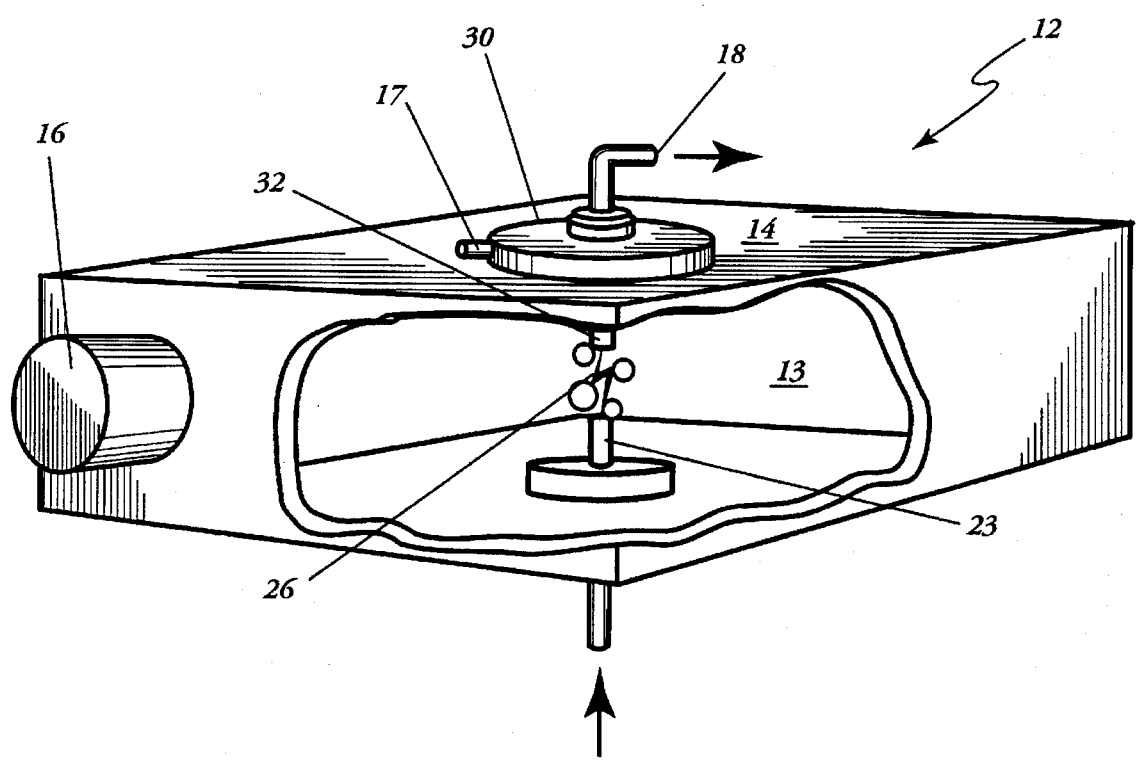
FIG. 8 is a cutaway perspective view of the decontamination module of the low flow batch waste water treatment system of FIG. 4.

FIG. 8 is an enlarged view of decontamination module 12 as used in the low flow batch treatment system 10. A rectangular housing 14 holds a cylindrically shaped interior decontamination chamber 13. Anode assembly 22 and cathode assembly 30 are attached in opposed positions to define an arc discharge area 26 between the proximal ends of anode electrode member 23 and cathode electrode member 32. Untreated water enters module 12 at intake 16 and treated water leaves at discharge 18 through cathode assembly 30. The dimensions of chamber 13 inside module 12 should be selected so that chamber 13 is acoustically resonant near the 60 HZ frequency of generation of shock waves inside the chamber 13. In a preferred embodiment of module 12 for use in the low flow batch treatment system, housing 14 of module 12 is 20" by 24" by 2". Chamber 13 will then have a diameter of 20".

FIGS. 6a and 6b are enlarged views of cathode assembly 30 and FIGS. 7a and 7b are enlarged views of anode assembly 22. Anode assembly 22 includes insulator 24, preferably made of a single piece of Teflon® PTFE or similar non-conductive material. Centrally disposed within insulator 24 is anode electrode member 23, made primarily of copper tubing or similar metallic tubing. To define a gas jet 21 and therefore allow passage of air or other gas into chamber 13 through anode assembly 22, anode electrode member 23 includes an annular orifice which passes through the center of anode electrode member 23 with the orifice opening into chamber 13 directly opposite cathode assembly 30. Because copper is prone to rapid destruction during arc generation, the proximal end of anode electric member 23 includes a lip portion (not shown) of tungsten or similar metal which can withstand repeated arcing with minimal erosion. The lip portion will preferably be an annular ring which fits inside anode electrode member 23, extending inwardly approximately one-quarter inch (¼") with the top surface of the lip flush with the proximal end of anode electrode member 23. The junction of anode electrode member 23 and insulator 24 is sealed against the passage of liquid by seal 28, seen best on FIG. 7a. The distal end of anode electrode member 23, which extends outside chamber 13, is machined or provided with a fitting to facilitate attachment of air hose from air valve 85.

Looking next at FIGS. 6a and 6b, cathode assembly 30 also includes an insulator 33 which surrounds a centrally disposed cathode electrode member 32. Cathode electrode member 32 is preferably also made of copper tubing with a lip portion (not shown) made of tungsten or similar metal to form the arc receiving area. Distal end of electrode member 32 includes an elbow which forms water discharge port 18 and which is machined or otherwise adapted to receive a connection from module discharge line 92 (FIG. 4). Fitting 17, which also communicates with cathode electrode member 32, is connected to recirculation line 84 (FIG. 4) to allow for recirculation of water within chamber 13 and purged air from module 12. A seal 35 is provided at the junction of cathode electrode member 32 with insulator 33 to prevent the escape of water from within chamber 13. Because cathode electrode member 32 in this embodiment does not have a sealed proximal end, treated water flows through electrode member 32 and out of chamber 13. The arcs actually contact the perimeter of cathode electrode member 32.

This particular system requires only 500 watts of average power input which includes the reaction chamber 13, pumps, and controls. The only consumable material input is from peroxide injection which typically consumes 42 gal/week. Once the system was in operation for testing, the contaminated water was tested before and after processing with the following results:

| Before Concentration | 19.2 PPM |
|---|---|
| After Concentration | <0.05 PPM |

Further field testing of the unit showed before concentrations of 22 ppm with after treatment concentrations of 0.06 ppm.

Further testing undertaken to prevent chemical contamination from creating a ground water problem was performed for a large salvage business. This process includes the treatment of washdown water and storm runoff water before it can contaminate the groundwater. A large number of different organic chemicals were detected in the water to be treated. The most cost effective treatment process included the addition of 0.1% hydrogen peroxide to increase the number of —OH ions and a holding time to allow both the —OH and ozone time to fully react. The system of the present invention very successfully eliminated all the problems related to these chemicals. The key chemicals treated and the results are as follows:

| Chemical | Before | After |
|---|---|---|
| Trichlorofluoromethane | 71.85 ppm | <1 ppb |
| Carbon Tetrachloride | 84.30 ppm | Not detected |
| Benzene | 57.09 ppm | <1 ppb |
| Trichloroethylene | 66.26 ppm | <1 ppb |
| Tetrachloroethylene | 117.5 ppm | Not detected |
| Toluene | 77.03 ppm | <1 ppb |
| 1,1,2,2-Tetrachloroethane | 126.4 ppm | <1 ppb |
| 1,4-Dichlorobenzene | 139.5 ppm | .02 ppm |
| Naphthalene | 134.8 ppm | Not detected |

Processing of Sludge

FIGS. 9–21 illustrate a fourth embodiment of the system of the present invention which is particularly adapted for the treatment of sludge. Three basic plumbing layouts of such a system 10 are shown on FIGS. 10a, 10b, and 10c. Untreated sludge enters the treatment chamber 13 through intake line 55. Valve 73 allows chamber 13 to be isolated for service. Otherwise, valve 73 is open, allowing passage of sludge into treatment chamber 13 of treatment module 12, at intake 16. A drain valve 65 is provided to drain the chamber 13 for service. An external source of air or other gas is supplied to chamber 13 through solenoid controlled air valve 85. This air is used for two purposes. First, as previously described, air is supplied through an anode assembly 22 (FIG. 13b) to an arc discharge area 26 within chamber 13 to facilitate generation of the arc. Second, the air is used to "blow down" the area between the anode electrode member 23 and cathode electrode member 32 in order to remove debris that may have accumulated there.

After the sludge has been treated within module 12, it is pumped out through discharge port 18 and dump valve 99, to treated sludge discharge line 100.

Figure 10A:
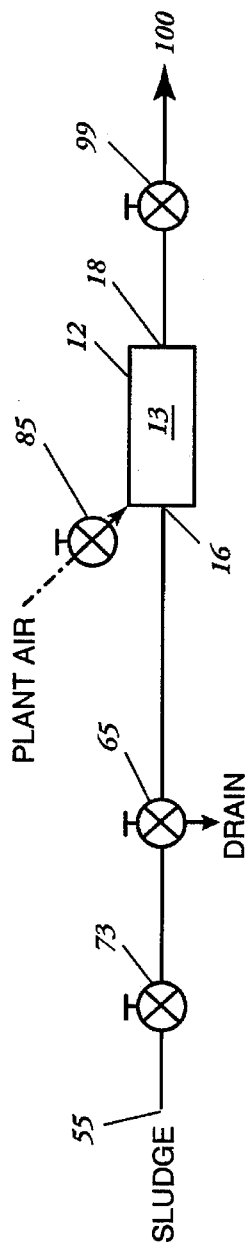
FIGS. 10a, 10b, and 10c are schematic representations of the plumbing system and components of the sludge treatment system of FIG. 9, showing the decontamination module in single chamber, dual serial chamber, and dual parallel chamber versions respectively.
Figure 10B:
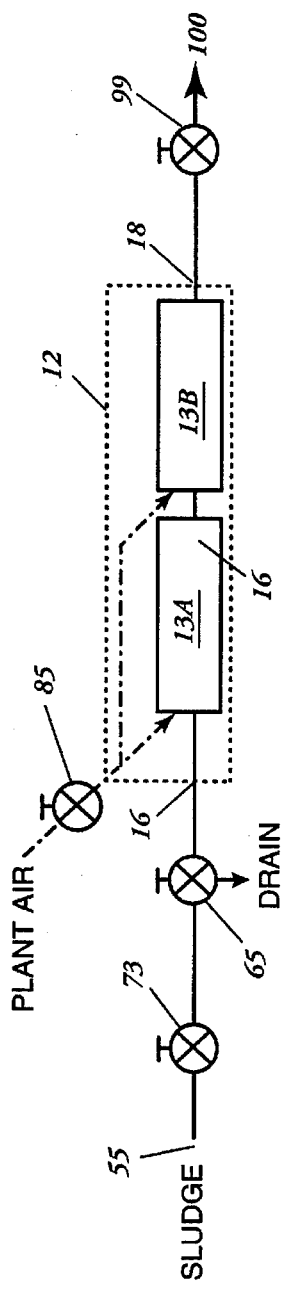

FIG. 10b shows an alternate arrangement of system 10 where two treatment chambers 13a and 13b are serially positioned within module 12, with the output of first chamber 13a feeding the input of second chamber 13b. Air is then supplied to both first chamber 13a and second chamber 13b.

Figure 10C:
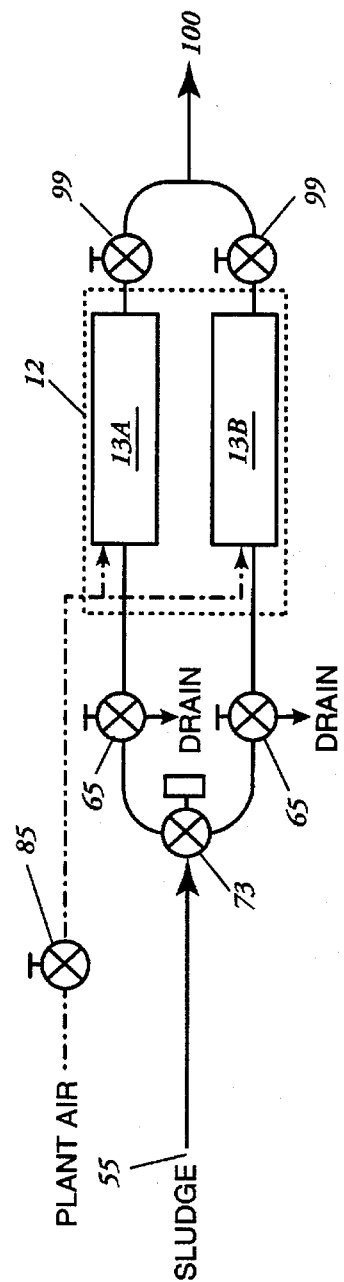

FIG. 10c represents a further modification of this embodiment in which two treatment chambers 13a and 13b operate in parallel rather than in series.

Figure 11A:
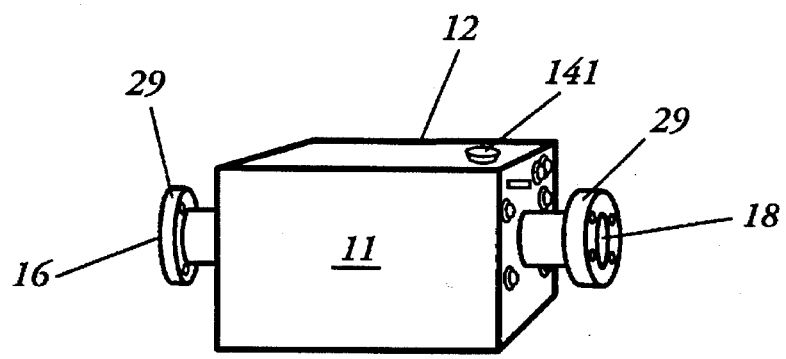
FIGS. 11a, 11b, and 11c are perspective views of the decontamination module of the sludge treatment system of FIG. 9., showing the module in the single chamber, dual parallel chamber, and dual serial chamber versions of FIGS. 10a, 10c, and 10b respectively.
Figure 11B:
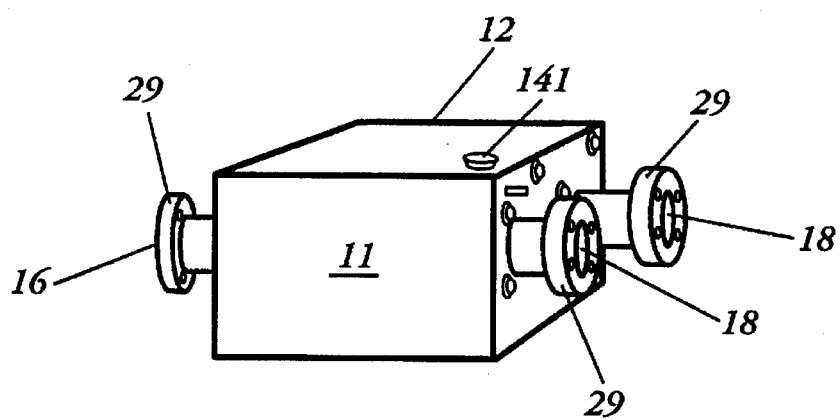
Figure 11C:
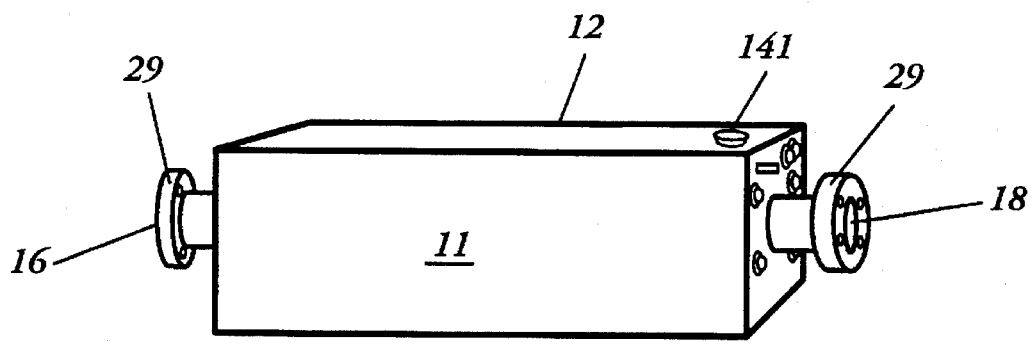

FIGS. 11a, 11b, and 11c are perspective views of module 12, corresponding to the different embodiments of the sludge treatment system shown on FIGS. 10a, 10c, and 10b respectively. Chamber 13 (not shown) is enclosed within module housing 11 with intake 16, including pipe flange 29, positioned at one end of housing 11 and discharge port 18, also including a pipe flange 29, at the other end. FIG. 11b, which corresponds to the embodiment of system 10 shown on FIG. 10c has two discharge ports 18, each with flanges 29, connected to first chamber 13a and second chamber 13b, respectively. An opening 141 is provided on one wall of housing 11 to allow passage within module 12 of the various control cables required.

Figure 12:
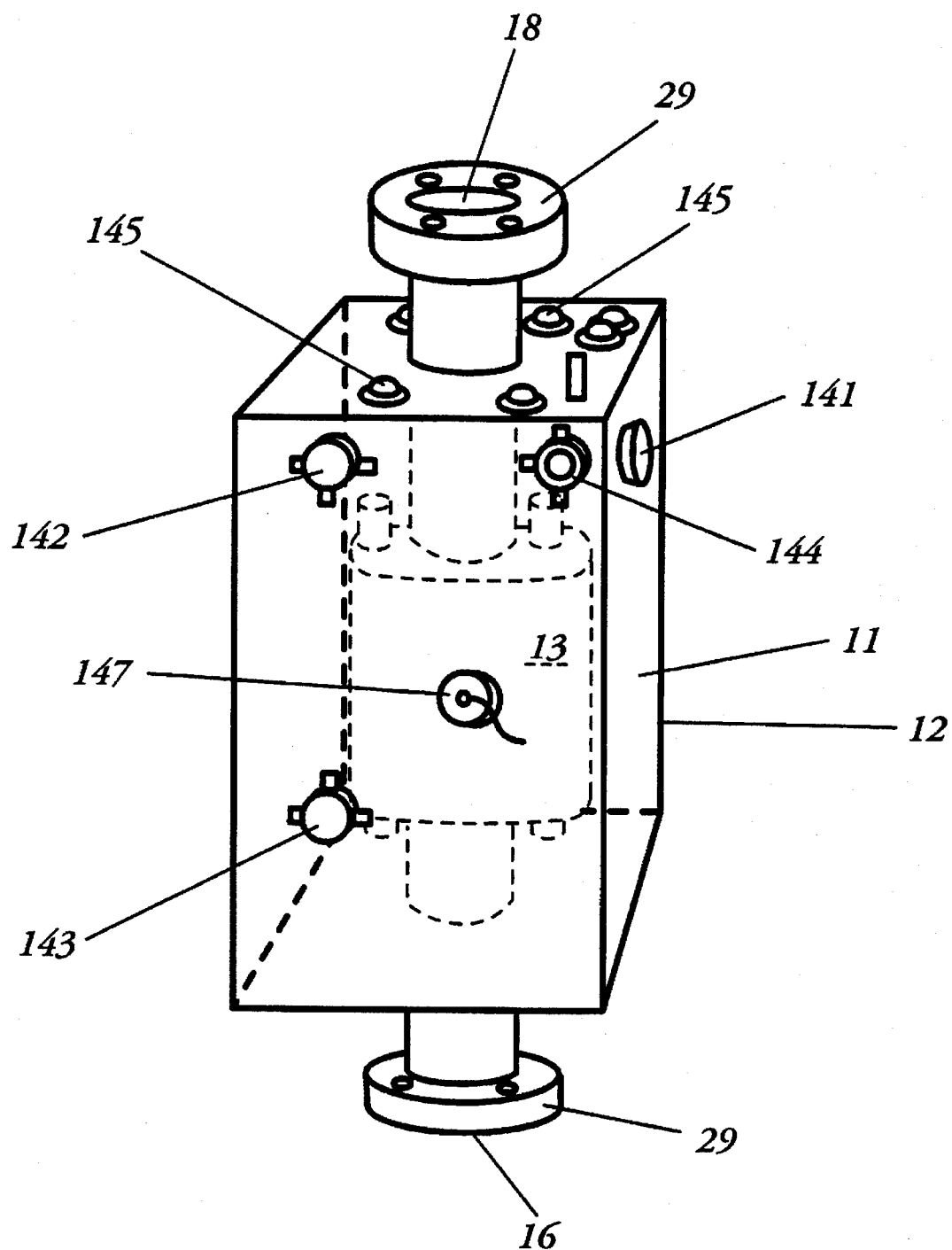
FIG. 12 is a perspective view of the single chamber module of FIGS. 10a and 11a, showing the inner dual electrode chamber in phantom.

FIG. 12 is a further enlarged view of module 12, corresponding to the embodiment of FIG. 10a, with the internal treatment chamber 13 shown in phantom. FIG. 12 also shows mounted to housing 11 of module 12 a shock sensor 147, the purpose of which is to detect the presence or absence of arcing within chamber 13. A blow down valve fitting 142 is also provided in housing 11 for blow down valve 159 (FIG. 21) and a fitting 143 for connection to an anode air valve 174. Dome regulator 144, mounted in the anode gas line, maintains the gas pressure at a level of approximately six to eight PSI above the process pressure of the sludge within chamber 13. This allows for adequate generation of gas bubbles in arc discharge area 26 to maintain the arc. Connectors 145 are attached to the top wall of housing 11 on FIG. 12 to coaxial connectors to connect the pulse generator 50 (not shown) to the first and second anode assemblies 22 and first and second cathode assemblies 30 mounted within chamber 13.

Figures 13A, 13B:
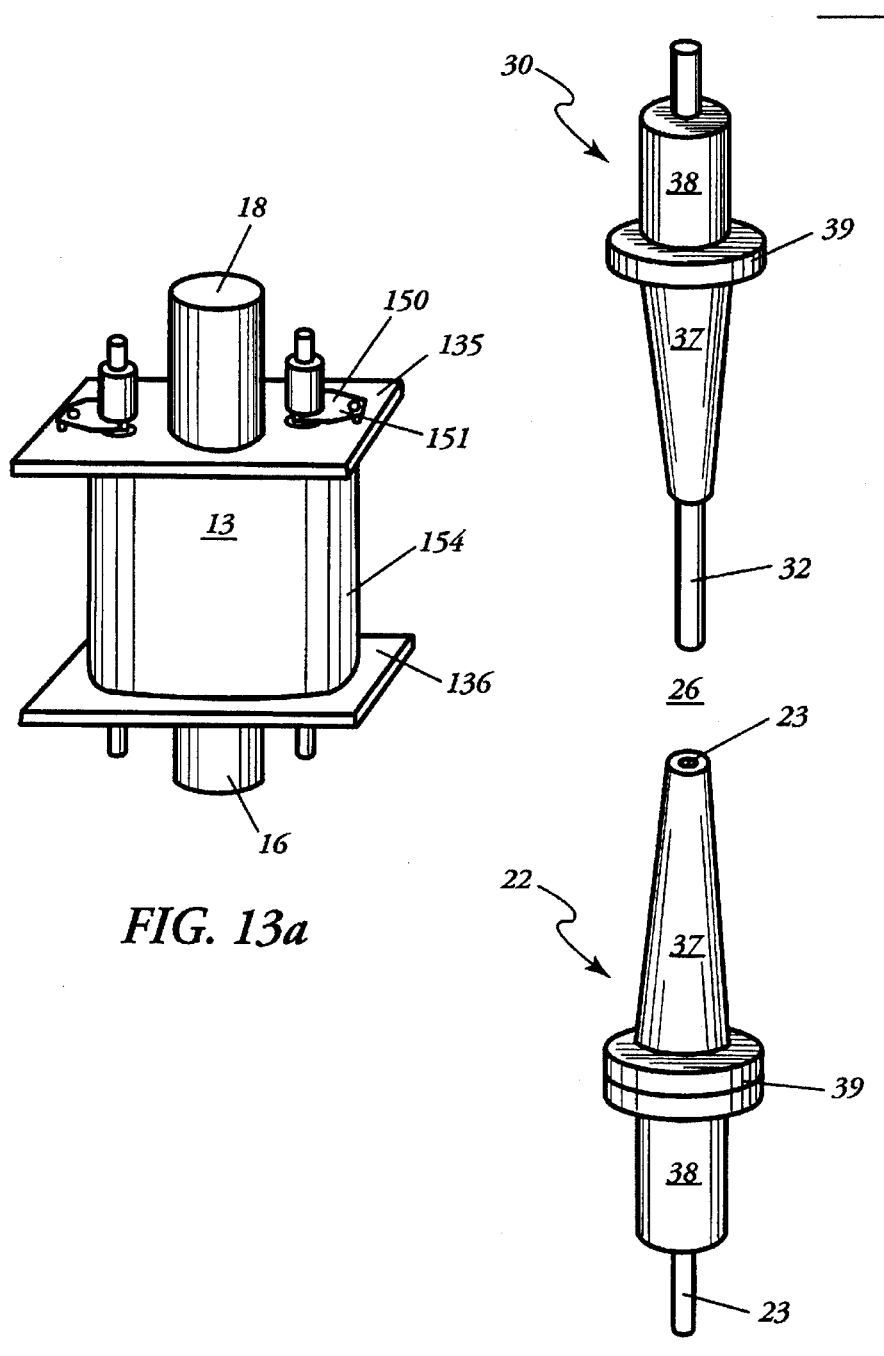

FIG. 13a is an enlarged view of chamber 13 as used in the sludge treatment system 10, including sludge intake 16 and discharge port 18. The top and bottom of chamber 13 are sealed by top plate 135 and bottom plate 136. First and second anode assemblies 22 (FIG. 13b) are mounted to bottom plate 136. Mounted to top plate 135 are first and second cathode assemblies 30 (FIG. 13b). Plates 135 and 136 are joined to the side wall 154 of chamber 13. Again, chamber 13 should be sized to enhance the effect of the arc generated shock waves by resonating it at or near 60 HZ. It otherwise should be made as small as possible to expose as much of the sludge as possible to the shock without restricting flow. In one embodiment of the sludge treatment system, chamber 13 is 10" high, approximately 5" deep and 7" wide.

FIG. 13b is an enlarged view of cathode assembly 30 and anode assembly 32 in an opposed position on the top and bottom plates of chamber 13 of FIG. 13a, to define two arc discharge areas 26 between them. The insulator 24 of anode assembly 22 includes a proximal conical section 37, a distal cylindrical section 38, and a central flange section 39.

Preferably, insulator 24 of anode assembly 22 is made of a single piece of Teflon® PTFE or similar non-conductive material. Anode electrode member 23 passes through the center of insulator 24 with a central orifice to allow the passage of air through anode assembly 22 into the discharge area 26.

Cathode assembly 30 also includes a one piece insulator 33 made up of a distal cylindrical section 38, a proximal conical section 37, and a flange section 39. Cathode electrode member 32, also extends through the center of electrode 33 into the arc discharge area 26 but, in this embodiment, has a sealed proximal end and no sludge passes through cathode assembly 30.

Figure 14:
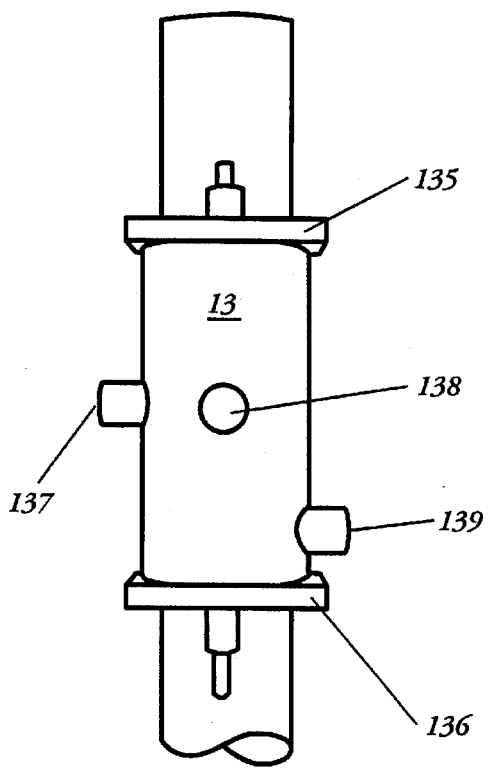
Figure 15:
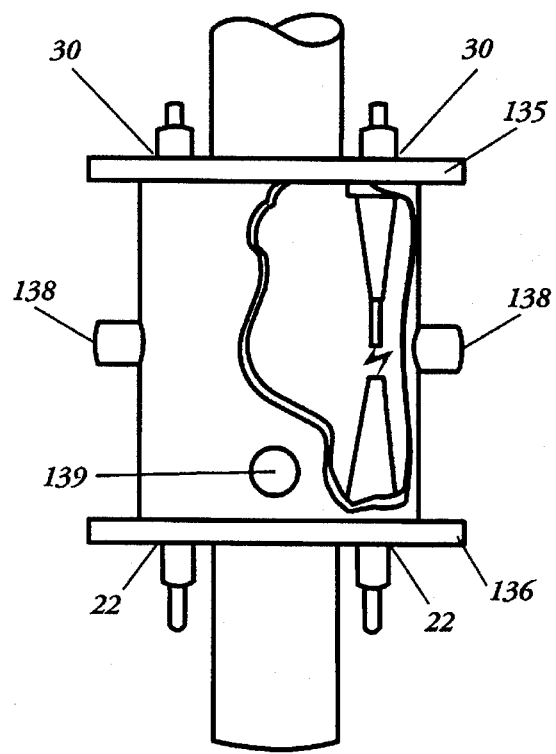
FIG. 15 is a partially cutaway front view of the chamber of FIG. 13a, showing the arc discharge area between one electrode pair.

FIGS. 14 and 15 provide additional detail about the features of treatment chamber 13. A pair of blow down nipples 138 are provided on side walls of chamber 13 to allow for the connection of an air line from module blow down fitting 142 (FIG. 12). Air can then be directed into each arc discharge area 26 to remove accumulated debris. Regulator input nipple 139 is connected to dome regulator 144 (FIG. 12) to provide data as to the pressure within chamber 13. Similarly, shock sensor nipple 137 allows for operative connection from chamber 13 to shock sensor 147.

Figure 16:
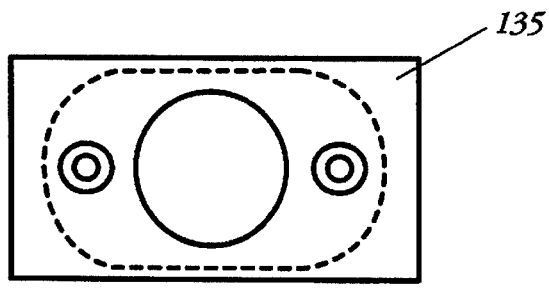

FIG. 16 is a top view of chamber 13 and top plate 135.

Figure 17:
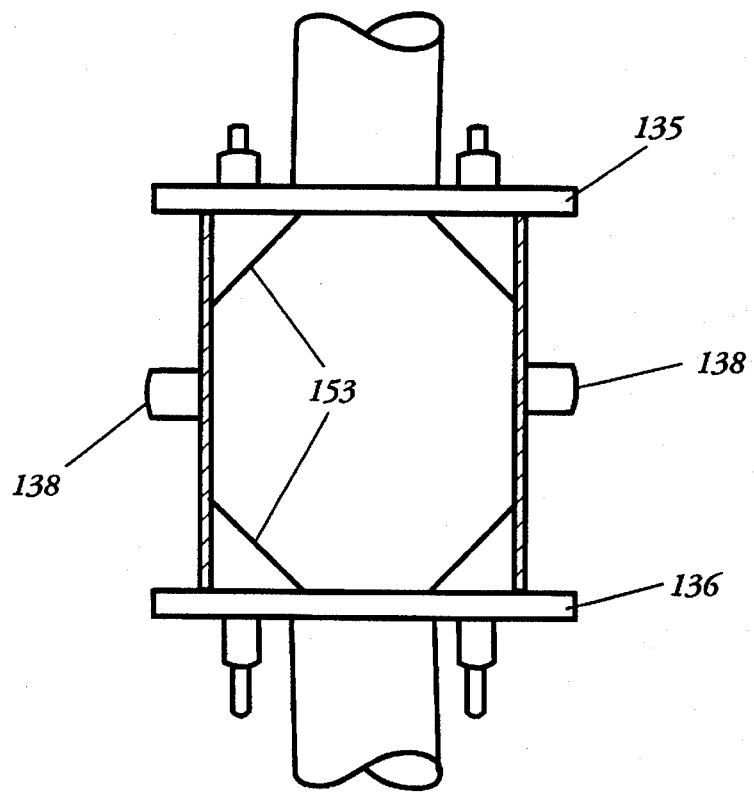
FIG. 17 is a cutaway view of the chamber of FIG. 13a, showing the location of the chamber baffles.

FIG. 17 is cut-away to show the placement of baffles 153 within chamber 13 to assist in maximizing the exposure of the untreated sludge to each arc discharge area 26 within chamber 13.

Figure 18:
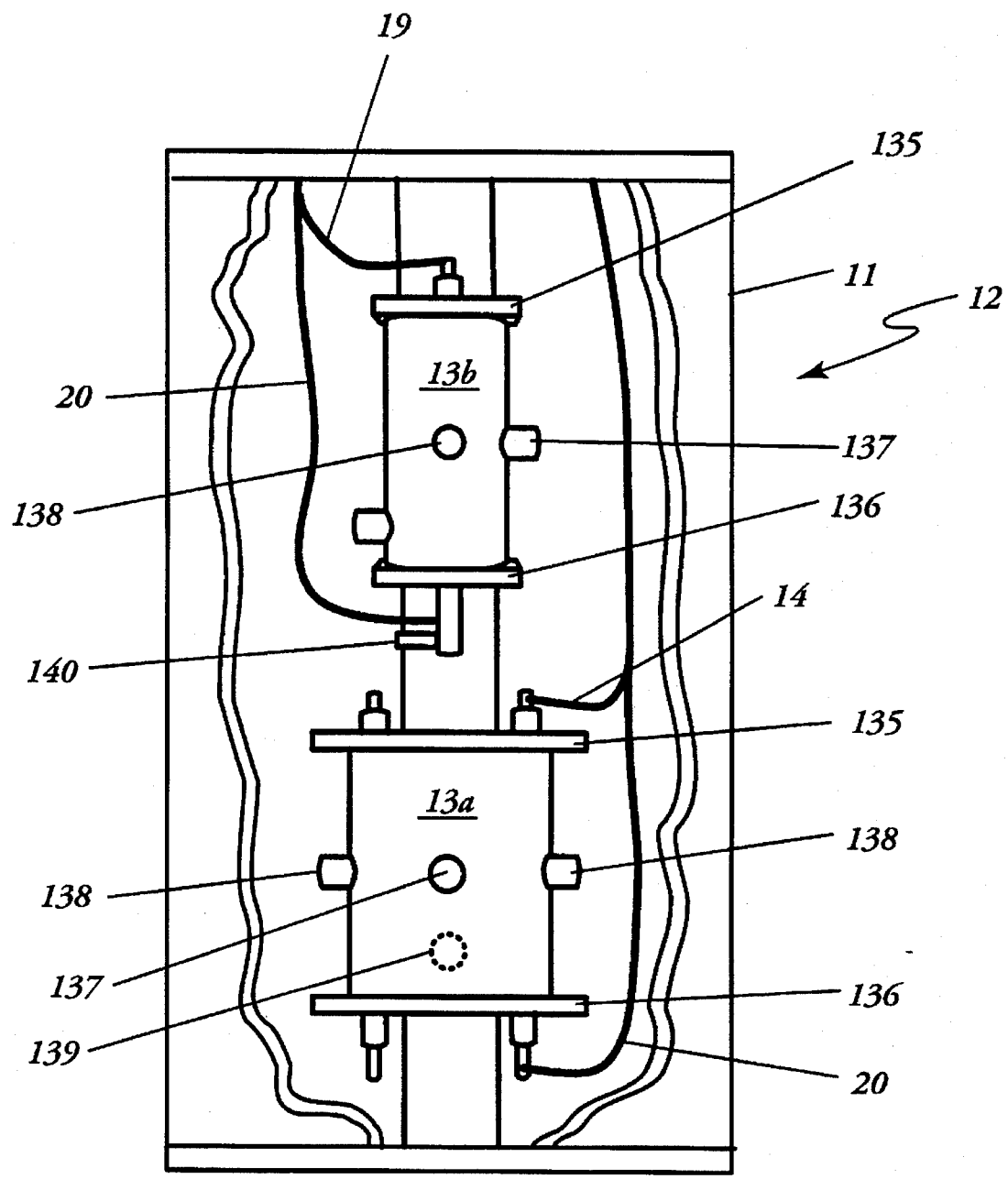
FIG. 18 is a cutaway view of a version of the decontamination module used in the sludge treatment system of FIG. 9, having serial electrode chambers as shown in FIGS. 10b and 11c.

FIG. 18 shows a serial connection of two treatment chambers 13a and 13b within a single module 12, as in FIG. 10b. Note that a positive cable 20 is connected to each of the four anode assemblies 22 and a negative cable 19 is connected to each of the cathode assemblies 30. Air nipple 140 allows for connection of an air supply to supply air through anode assembly 22.

Figure 19A:
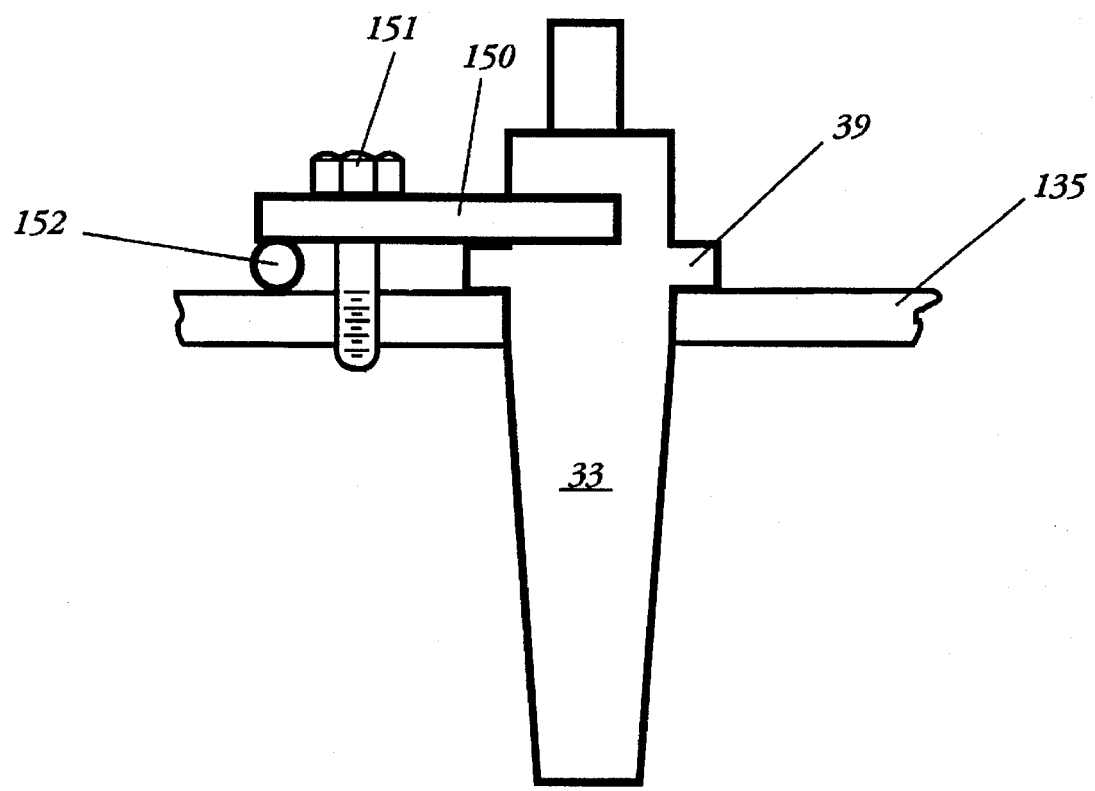
FIG. 19a is an enlarged cross-sectional view of the cathode assembly of FIG. 15, showing the clamping arrangement of the insulator to the top plate of the chamber.
Figure 19B:
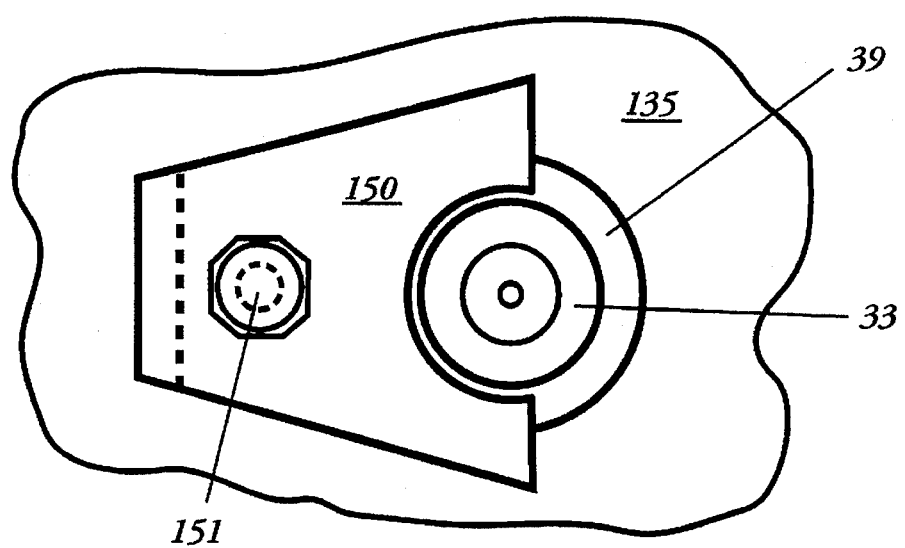

FIGS. 19a and 19b provide additional detail about how the anode and cathode assemblies 22 and 30 are secured to top plate 135 of chamber 13. Flange section 39 of insulator 33 of cathode assembly 30 purposes fits against the distal top surface of top plate 135. Clamping plate 150 is placed over flange portion 39 and is secured in a downward direction by clamping screw 151. A spacer 152 is welded to and fits between the lower surface of clamping plate 150 and the top surface of top plate 135 to provide leverage for the clamp. A similar clamping arrangement is used for the anode assemblies on lower plate 136.

Figure 20:
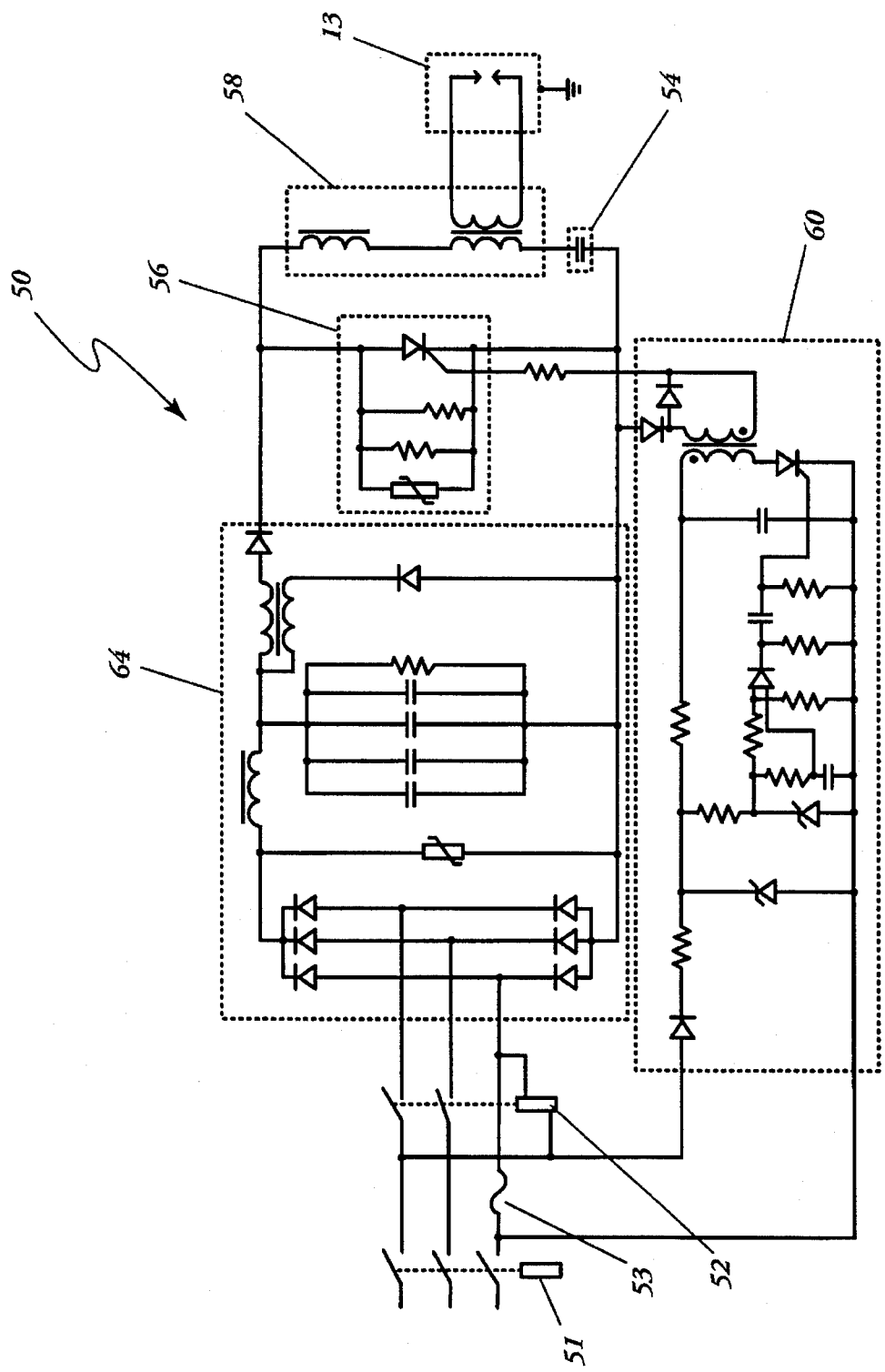
FIG. 20 is a schematic representation of the pulse generator of the embodiment of the liquid decontamination system used in the low flow batch waste water treatment system of FIG. 4 and in the sludge treatment system of FIG. 10b.

FIG. 20 is a schematic representation of the pulse generator 50 used in of the system of this embodiment. If, as in the preferred embodiment, there are two anode and cathode assemblies in each chamber 13, there will be two pulse generators 50a and 50b as well. The arcs themselves are generated by a solid state switch 56 through pulse transformer 58. Power supply rectifier section 64 supplies power to switch unit 56. Timing circuit 60 generates appropriate pulses at the gate of the SCR in solid state switch 56 to turn the arcs on and off. Power to pulse generator unit 50 is supplied through first relay 51, thermal circuit breaker 53, and further through time delay relay 52. Time delay relay 52 provides a six second delay to allow for completion of the blow down of the arc discharge areas 26 and to allow the pulse triggers of timing circuit 60 to stabilize before applying power to solid state switch 56. The preferred pulse frequency is 60 HZ, with a pulse width of 15 microseconds. Each arc will have a peak voltage of 35 kV and peak current of 70 amperes. Solid state switch must be a device, such as a silicon controlled rectifier (SCR) having a very fast rise time. SCR device model number TR220CH12FHO, available from Westcode Company is suitable. It is rated at 4000 volts, 20 kA.

Figure 9:
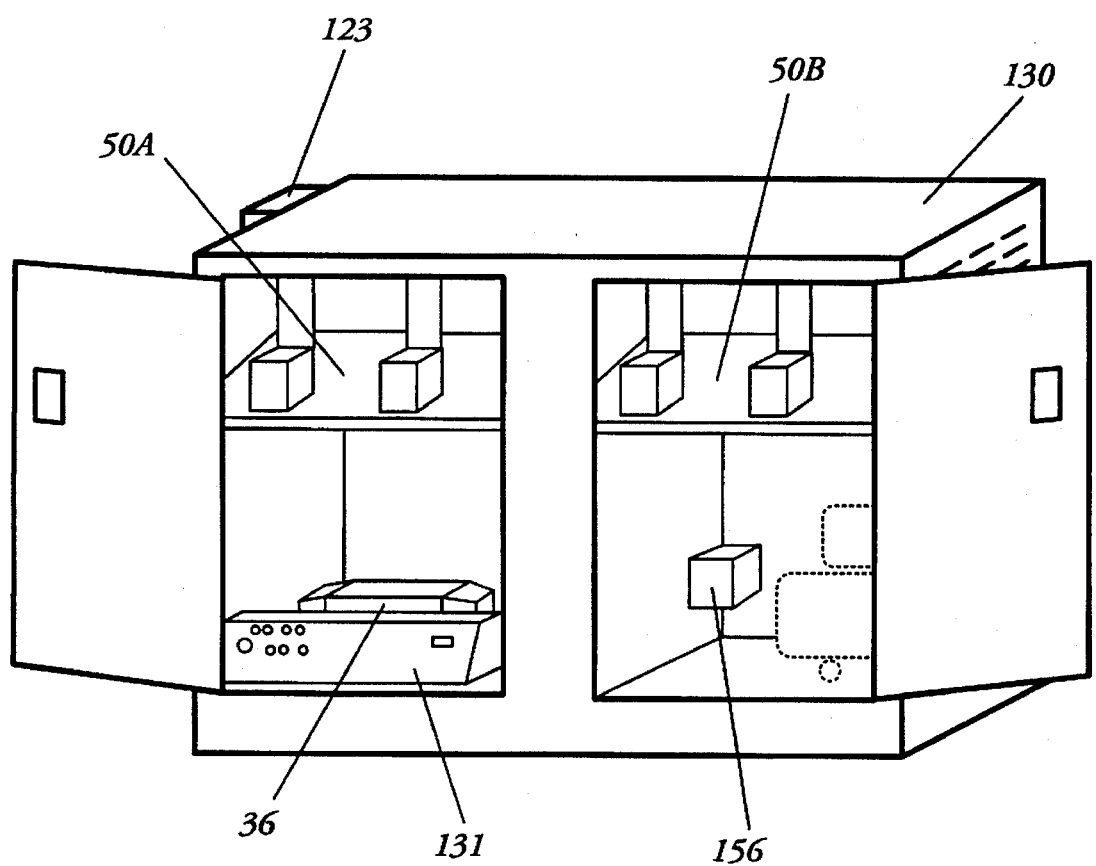
FIG. 9 is perspective view of the system cabinet of a fourth embodiment of the liquid decontamination system which is configured for treatment of sludge.
Figure 21:
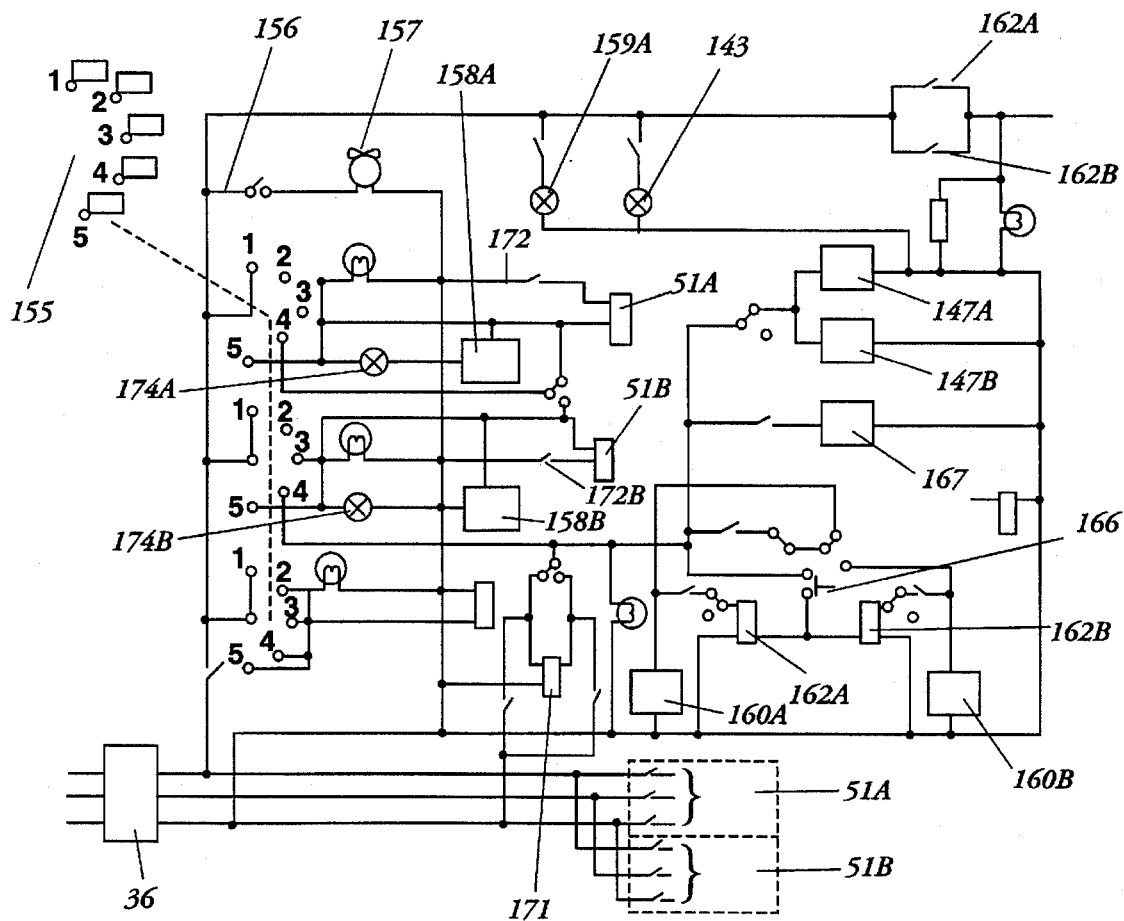
FIG. 21 is a schematic representation of the electrical system and components of the sludge treatment system embodiment of the liquid decontamination system.

Preferably, the system is arranged so that each pair of electrodes in each chamber operate simultaneously, providing dual arc discharge areas 26 in each chamber. Dual chambers are provided for redundancy and to allow for a longer operational life. Each chamber 13a and 13b is powered by two identical pulse generators 50, one for each pair of electrodes. Each pair of pulse generators 50 makes up a channel. Thus, the description and reference herein to a pulse generator 50a or 50b inherently includes two such units working together, with a single unit illustrated in FIG. 20. FIG. 9, then, shows the placement of some of the components and sub-systems of in the cabinet 130 of system 10, including main breaker 123, main power transformer 36, fan relay 156, and first and second channel pulse generators 50a and 50b, each channel having two units, FIG. 21 schematically represents the control system for the sludge treatment system 10 in the present invention. A mode switch 155 is provided which places system 10 either in an OFF position, selects channel 1 operation, corresponding to the first treatment chamber 13a, Channel 2 only operation, corresponding to a second treatment chamber 13b, an automatic mode, which automatically switches between Channel 1 and Channel 2 every thirty minutes, or a combined mode where both Channel 1 (chamber 13a) and Channel (chamber 13b) operate simultaneously.

If system 10 is placed in the automatic mode, Channel 1 (chamber 13a on FIG. 10c) is first energized. Fan relay 156 is energized, turning on ventilation fan 157. First channel blow down timer 158a then activates blow down valve 159a for two seconds to supply blow down air (preferably unregulated at 100 to 120 PSI) to are discharge area 26 of first chamber 13a. This dislodges any debris that may have accumulated within chamber 13a near the arc discharge area. Simultaneously, power is also supplied to a fault circuit, the purpose of which is to either disable system 10 when no arcing is detected or to cause it to automatically switch to the alternate channel. Therefore, first channel fault latching relay timer 160a delays the application of power to first channel fault latching relay 162a for thirty seconds, to allow first channel pulse generator system 50a to start and establish a stable arc. After this delay, a fault, that is a loss of arcing sensed by first channel shock sensor 147a, will cause first channel fault latching relay 162a to close.

Also simultaneously, power is applied to first power relay 51a which energizes and applies power to first channel pulse generator unit 50a. A six second delay is built into pulse generator unit 50a (time delay relay 52a on FIG. 21). Power is also applied to timer 167 which is a motorized thirty minute timer. At the end of the timing sequence, timer 167 energizes channel selector relay 171 which removes power from Channel 1 (first pulse generator unit 50a) and applies it to Channel 2 (second pulse generator unit 50b), then the entire sequence starts over.

Assuming that first and second channel enable switches 172a or 172b are on, the loss of arc in the operational chamber 13a or 13b will cause a high signal to be generated on the corresponding shock sensors 147a or 147b. This causes either relay 162a or b to energize and latch, thereby locking out timer 167, and either energizes or resets switch 171 to select the alternate channel. Reset switch 166 allows system 10 to be reset after a fault has been detected. Also, if both channels experience a fault before reset switch 166 is pressed, the latched default relay (either 162a or 162b) in the initial channel where the fault is detected will cause the entire system 10 to shut down. This prevents system 10 from bouncing repeatedly between two dead channels. In normal operation, the sludge treatment system 10 runs continuously.

In the treatment of waste water for pathogen kill it was discovered that a major and perhaps more significant side effect was present. The living organisms or "bugs" used for waste water treatment were physically altered during the treatment process. It was discovered that the structural alteration of the bugs could significantly improve the de-watering time and increase the amount of water removed during sludge processing as utilized in almost all of the treatment plants in the word. Based upon this contention de-watering experiments on actual waste water plant sludge were performed. The result was that the new system 10 could de-water biological sludge at twice the rate obtained by conventional equipment alone. The system 10 can be implemented as an add-on to existing or new de-watering equipment, thereby allowing the equipment to run twice as fast or cycle in half the time. This applies to all prior art de-watering processes and equipment to include the belt press, the filter press and the centrifugal de-watering equipment. The approach is electrical in nature, requires little energy input, has a small package size and has a low initial hardware cost.

The important effect in sludge processing is the very intense shock wave produced by the arc. The over-pressure can reach 5000 atmospheres. It is this intense shock that creates the mechanical damage to the cell structure of the bugs. This shock treatment of the sludge just before it enters the de-watering operation forces a large percentage of the microorganisms to give up their internally contained water. This is accomplished by rupturing the cell membrane releasing the vacuole fluid. The result is faster de-watering and a drier cake.

The production of the arc in the water is the key to this approach. Arcs are very difficult to create in water because water is a good dielectric material. In the pulse mode water appears to have a dielectric constant of 47. Because water in the real world is never pure, the water is also highly conductive, making the creation of an arc even more difficult due to the lowering of the effective voltage due and the resistive grading of the electrical stress concentrations which are required to initiate arcs. These problems are overcome only by the use of high peak power, short pulses with fast rise times. The peak power necessary to begin to see a significant effect is approximately one megawatt per pulse. Since the present system uses short pulses, the total energy consumption is low and the resultant operating costs are extremely low. For example, 3000 watts of average power can process 100 gallons per minute. This is roughly equivalent to a home hot water heater.

This system has been tested with sludge from many sources and has yielded a decrease in de-watering time from a factor of two to a factor of four. Laboratory tests show that 300 watts of electrical power can treat 70–150 gallons per minute of sludge on a continuous basis with no additional energy or chemical requirements.

The result was that the new system of the present invention could improve de-watering efficiency of all types of biological sludges and some types of non-biological sludges. Air or oxygen can be injected into the arc during the treatment process to form ozone. This ozone is a strong oxidizer and thus helps to negate the expected increase in BOD and COD when the cell walls are ruptured and the internal fluid released; however, when the cell walls are ruptured and the vacuole fluid is released, there is an increase in nutrients in the filtrate water, which includes nitrogen and phosphorous. The phosphorous levels typically increased by a factor of four or about 0.2 to 0.8 ppm. Since phosphorous is a basic nutrient for the "bugs" it is expected that the return of this phosphorous to the head-end of the plant presents no problem and could result in a cost savings. In cases where phosphorous is a problem, quicklime or hydrated-lime can be added to precipitate out the phosphorous before the filtrate water is returned to the system. In the case of hydrated-lime, 0.85 ppm is required to neutralize 1.0 ppm of phosphate or about eight pounds per million gallons of water.

Gravity de-watering in the present system occurs at up to twice the rate obtained by conventional equipment alone. The final cake dryness has improved by between 3.5 and 10 percentage points. It should be noted that the increase in cake dryness is associated with the proper selection of polymer type and volume. When the sludge is treated by the arc system, its associated charge tends to become less negative thus requiring less positive charge from the polymer to be neutralized. The quantity of polymer required also tends to be less. The major point is that the ideal polymer for the treated case differs from the ideal polymer for the untreated case. Experiments have been performed and the results verified on increased cake dryness, increased through-put, decreased polymer requirements, changes in polymer makeup, decreases in water requirements, TSS in the filtrate water, pathogen kill, phosphorous and nitrogen content in the filtrate, COD, and BOD. Average results over an extended testing period are as follows:
3.5 percentage points increase in dryness of the cake.
80% decrease in TSS of the filtrate water.
2.9 tons per day reduction in return solids from TSS.
a 29% decrease in polymer usage.
E. Coli reduction in filtrate from 2200 to 200 colonies per 100 ml.
Polymer dilution water reduced by 28,800 gallons per day.
Phosphorous increase from 0.19 ppm to 0.71 ppm in filtrate.
COD of 400.

Kill of pathogens to include E. Coli and other bacteria and viruses results primarily from the UV radiation from an electrical arc under water. To get the maximum UV energy per pulse requires the arc temperature to be about 15000k which emits soft UV between 250 and 270 nanometers. Extensive UV research has proven that maximum pathogen kill occurs when the energy is centered around 260 nm. This is an exact match with the present system.

A polymer is often added to the sludge in conventional treatment systems to "floc" the sludge, that is, make the suspended matter clump up and either float of sink. Once the sludge is passed through the system of the present invention, the polymer requirement changes. The type of polymer needed will be different because the charge on the sludge is less negative once the material is treated and the volume of polymer is different because the cell structure has been altered. The most important point to recognize in connection with the polymer requirements is that the type of polymer will be different for treated and untreated sludge.

A preferred polymer used without this system will have a high positive charge and low molecular weight. After the treatment process the optimum polymer is a low positive charge, high molecular weight type. The quantity of polymer is greatly reduced (20%–40%) depending on the polymer type selected.

Other significant cost savings that have been documented include a major reduction of the total suspended solids (TSS) in the filtrate water and a significant reduction of additional treatment water. The TSS of the filtrate water from the belt presses typically runs 2000 alone and approximately 200 after using the present system. This results in a reduced amount of solids returned to the head-end of the plant for reprocessing. Because the TSS is low and the press runs much cleaner, a significant reduction in washdown water is seen.

Special Applications

The system described above can be used as a final polisher for existing water purification systems at a very low energy level. This works well in cases where the contaminate is a larger microorganism such as those found in many Mexican water supplies. The arc system can be used to replace the chlorination system for swimming pool applications. The —OH radicals, the UV radiation and the ozone produced will clean the water very well.

The system can be used to burn air borne contaminants in applications where volatile chemicals or solvents are used.

Thus, although there have been described particular embodiments of the present invention of a new and useful method and apparatus for liquid decontamination using electrical discharge with gas injection, it is not intended that such references be construed as limitations upon the scope of this invention except as set forth in the following claims. Further, although there have been described certain dimensions and operational parameters used in the preferred embodiments, it is not intended that such dimensions be construed as limitations upon the scope of this invention except as set forth in the following claims.

What we claim is:

1. A liquid decontamination system comprising:
   a. at least one decontamination module;
   b. chamber means for holding liquid to be decontaminated, said chamber means integral to said module;
   c. at least one anode assembly, said anode assembly including an anode electrode member, at least one cathode assembly, said cathode assembly including a cathode electrode member, said anode and cathode electrode members positioned in an opposed arrangement within said chamber means to define an arc discharge area between them;
   b. liquid flow means for directing a flow of the liquid through said chamber means proximate the arc discharge area;
   c. gas injector means for injecting a gas into the liquid in the arc discharge area, said gas injector means comprising a gas jet integral to said anode assembly whereby the gas is injected through the anode; and
   d. pulse generator means for generating a series of electric arcs between said anode electrode member and said cathode electrode members.

2. The system of claim 1 further comprising liquid recirculation means for recirculating the liquid within said chamber means.

3. The system of claim 1 further comprising means for injecting an ion and free radical enhancing compound into the liquid before the liquid enters the chamber means.

4. The system of claim 1 further comprising oxidizer means for enhancing the distribution in the liquid of an oxidizing agent after the liquid leaves the chamber means.

5. The system of claim 1, said gas jet comprising a gas orifice extending from outside said chamber, passing longitudinally through said anode electrode member, and opening into the arc discharge area.

6. The system of claim 5, said anode electrode assembly further comprising an insulator disposed around said anode electrode member and said anode electrode member comprising a conductive tube and a lip portion made of a second metal, said lip portion inserted within said tube proximate the arc discharge area to define a proximal end of said cathode electrode member.

7. The system of claim 6, said cathode assembly comprising an insulator disposed around said cathode electrode member and said cathode electrode member comprising a metallic tube having a proximal end made of the second metal, said proximal end proximate the arc discharge area.

8. The system of claim 7, said proximal end of said cathode electrode member defining an opening into said metallic tube to create a liquid flow discharge passage from inside said chamber means and through said cathode electrode member.

9. The system of claim 8, said cathode insulator and said anode insulator each having a conical shaped proximal section which tapers inwardly toward said arc discharge area.

10. The system of claim 9, said cathode insulator and said anode insulator each having a flange section, said chamber means having a side wall, an upper plate and a lower plate attached to said side wall of said chamber, and said module further comprising a plurality of clamping means for clamping said flange section of said cathode insulator to said upper plate and for clamping said flange section of said anode insulator to said lower plate.

11. The system of claim 9, said chamber means further comprising a plurality of flow directing baffles interior to said chamber.

12. A batch water treatment system comprising:
 a. a pre-process tank;
 b. a storage tank;
 c. means to deliver an ion and free radical enhancing compound from said storage tank to said pre-process tank;
 d. means to deliver untreated water to said pre-process tank;
 e. a decontamination chamber, said chamber including an anode and a cathode positioned within said chamber to define an arc discharge area between said anode and said cathode in said chamber; cathode in said chamber;
 f. pulse generator means to generate a series of arcs between said anode and said cathode in the arc discharge area;
 g. means to inject gas into said chamber in the arc discharge area;
 h. an oxidizer tower, said tower including means to distribute an oxidizing agent in the water passing through said tower;
 i. means to deliver water from said pre-process tank to said decontamination chamber;
 j. means to deliver water from said decontamination chamber to said oxidizer tower;
 k. a post-process holding tank;
 l. means to deliver water from said oxidizer tower to said post-process holding tank; and
 m. means to discharge treated water from said post-process holding tank.

13. The water treatment system of claim 12 further comprising means to recirculate water within said decontamination chamber.

14. The water treatment system of claim 13 further comprising control means for controlling the movement of water in and out of said pre-process tank, said decontamination chamber, said oxidizer tower, and said post-process holding tank.

15. A sludge treatment system comprising:
 a. a treatment module, said module including a first treatment chamber;
 b. a first anode assembly and a first cathode assembly mounted in opposed positions within said first chamber to define a first arc discharge area between said first anode assembly and said second cathode assembly;
 c. means to deliver untreated sludge to said first chamber;
 d. means to deliver gas into said first chamber, including first gas injection means to inject the gas through the first anode assembly into the first arc discharge area;
 e. means to remove treated sludge from said module; and
 f. first solid state switch means for generating a sequence of arc producing pulses to said first anode assembly and said first cathode assembly, said pulses having a sufficient voltage and current to create an arc within the sludge.

16. The sludge treatment system of claim 15 further comprising:
 a. a second anode assembly and a second cathode assembly positioned within said first chamber to define a second arc discharge area between said second anode assembly and said second cathode assembly;
 b. second gas injection means to inject the gas through said second anode assembly into the second arc discharge area within said first chamber; and
 c. second solid state switch means for generating a sequence of arc producing pulses to said second anode assembly and said second cathode assembly, said pulses having a sufficient voltage and current to create an arc within the sludge.

17. The sludge treatment system of claim 16 further comprising:
 a. second treatment module, said second module including a second treatment chamber;
 b. third and fourth anode assemblies and third and fourth cathode assemblies mounted in opposed positions within said second chamber to define third and fourth arc discharge areas between said third anode assembly and said third cathode assembly and said fourth anode assembly and a said fourth cathode assembly respectively;
 c. third and fourth gas injection means for injecting the gas through the third and fourth anode assemblies respectively into the third and fourth arc discharge areas respectively within said second chamber; and
 d. third and fourth solid state switch means for generating a sequence of arc producing pulses to said third and fourth anode assemblies and said third and fourth cathode assemblies respectively, said pulses having a sufficient voltage and current to create an arc within the sludge.

18. The sludge treatment system of claim 17 wherein said first module and said second module are operatively connected in parallel.

19. The sludge treatment system of claim 17 wherein said first module and said second module are operatively connected in series.

20. The sludge treatment system of claim 19 further comprising means to remove debris that has accumulated between said anode and said cathode assemblies in said arc discharge area.

21. The sludge treatment system of claim 20 further comprising control means to control each of said solid state switch means and said means for removing debris in said arc discharge area.

22. The sludge treatment system of claim 21, said control system including fault sensing means to detect an absence of arcing area within said each of said chambers and for shutting down said system when an absence of arcing is detected.

23. The sludge treatment system of claim 22, said control system further comprising means to regulate the pressure of the gas delivered to each of said chambers and to maintain a predetermined level of pressure above the pressure of the sludge within said chambers.

24. The sludge treatment system of claim 15 wherein said gas injection means comprises an anode electrode having an internal orifice from outside said chamber into said chamber.

25. The sludge treatment system of claim 24 wherein said cathode assembly comprises a cathode electrode member having an internal orifice from inside said chamber to outside said chamber.

26. The sludge treatment system of claim 15 wherein said chamber is sized to be acoustically resonant near the frequency of pulses being generated within said chamber.

27. A method of liquid purification comprising the steps of:
  a. directing the liquid to be purified through a first chamber;
  b. introducing gas bubbles into the first chamber between a first pair of electrodes, the gas injected through one of said pair of electrodes; and
  c. generating a series of pulsed electric discharge arcs within the first module between the electrodes at energy levels sufficient to sustain the arc within the liquid during the pulse and to produce a series of pulsed mechanical shock waves within the liquid.

28. The method of claim 27 further comprising the steps of introducing gas bubbles into the first chamber between a second pair of electrodes by injecting the gas through one of said second pair of electrodes and generating a series of pulsed electric discharge arcs within the first chamber between the second pair of electrodes at energy levels sufficient to sustain the arc within the liquid during the pulse and to produce a series of pulsed mechanical shock waves within the liquid.

29. The method of claim 28 further comprising the step of injecting an ion and free radical enhancing compound into the liquid before it enters the chamber.

30. The method of claim 29 further comprising the step of enhancing the distribution of an oxidizing agent in the liquid after it leaves the chamber.

* * * * *